United States Patent
Gassend et al.

(10) Patent No.: US 12,130,389 B2
(45) Date of Patent: *Oct. 29, 2024

(54) METHODS AND SYSTEMS FOR DETECTING SENSOR OCCLUSIONS

(71) Applicant: Waymo LLC, Mountain View, CA (US)

(72) Inventors: Blaise Gassend, East Palo Alto, CA (US); Nicholas Armstrong-Crews, Mountain View, CA (US); Scott McCloskey, Mountain View, CA (US)

(73) Assignee: Waymo, LLC, Mountain View, CA (US)

( * ) Notice: Subject to any disclaimer, the term of this patent is extended or adjusted under 35 U.S.C. 154(b) by 879 days.

This patent is subject to a terminal disclaimer.

(21) Appl. No.: 17/198,020

(22) Filed: Mar. 10, 2021

(65) Prior Publication Data

US 2021/0215810 A1    Jul. 15, 2021

Related U.S. Application Data

(63) Continuation of application No. 16/242,191, filed on Jan. 8, 2019, now Pat. No. 10,976,420.

(Continued)

(51) Int. Cl.
*G01S 7/00* (2006.01)
*G01S 7/481* (2006.01)
(Continued)

(52) U.S. Cl.
CPC ............ *G01S 7/497* (2013.01); *G01S 7/4813* (2013.01); *G02B 27/0006* (2013.01); *G01S 2007/4977* (2013.01)

(58) Field of Classification Search
CPC ................... G01S 7/497; G01S 7/4813; G01S 2007/4977; G01S 7/4817; G01S 17/42;
(Continued)

(56) References Cited

U.S. PATENT DOCUMENTS

| 5,748,356 A | 5/1998 | Park et al. |
| 6,219,168 B1 | 4/2001 | Wang |

(Continued)

FOREIGN PATENT DOCUMENTS

| JP | 5589705 B2 | 9/2014 |
| KR | 10-2015-0097950 A | 8/2015 |
| WO | 2018187089 A1 | 10/2018 |

OTHER PUBLICATIONS

International Search Report and Written Opinion, dated Sep. 1, 2020, for International Application No. PCT/US2019/058265.

*Primary Examiner* — Henry Duong
(74) *Attorney, Agent, or Firm* — McDonnell Boehnen Hulbert & Bergoff LLP

(57) ABSTRACT

One example method involves rotating a housing of a light detection and ranging (LIDAR) device about a first axis. The housing includes a first optical window and a second optical window. The method also involves transmitting a first plurality of light pulses through the first optical window to obtain a first scan of a field-of-view (FOV) of the LIDAR device. The method also involves transmitting a second plurality of light pulses through the second optical window to obtain a second scan of the FOV. The method also involves identifying, based on the first scan and the second scan, a portion of the FOV that is at least partially occluded by an occlusion.

20 Claims, 10 Drawing Sheets

Related U.S. Application Data

(60) Provisional application No. 62/755,011, filed on Nov. 2, 2018.

(51) Int. Cl.
*G01S 7/497* (2006.01)
*G02B 27/00* (2006.01)

(58) Field of Classification Search
CPC ........ G01S 17/89; G01S 17/931; G01S 17/04; G02B 27/0006; G02B 26/101; B60R 1/0602; B60S 1/0818; B60S 1/0848; H04N 23/55; H04N 23/811; H04N 23/957
USPC ....................................................... 359/508
See application file for complete search history.

(56) References Cited

U.S. PATENT DOCUMENTS

| | | |
|---|---|---|
| 6,542,227 B2 | 4/2003 | Jamieson et al. |
| 6,650,407 B2 | 11/2003 | Jamieson et al. |
| 8,810,796 B2 | 8/2014 | Hays et al. |
| 9,086,488 B2 | 7/2015 | Tchoryk, Jr. et al. |
| 9,091,535 B2 | 7/2015 | Baeg et al. |
| 10,001,551 B1 | 6/2018 | Gassend et al. |
| 10,168,423 B2 | 1/2019 | Lombrozo et al. |
| 10,191,146 B2 | 1/2019 | Gassend et al. |
| 10,324,170 B1* | 6/2019 | Engberg, Jr. .......... G01S 7/4818 |
| 10,976,420 B2* | 4/2021 | Gassend ............... G01S 7/4813 |
| 2004/0212863 A1 | 10/2004 | Schanz et al. |
| 2007/0201027 A1 | 8/2007 | Doushkina et al. |
| 2008/0210881 A1 | 9/2008 | Harris et al. |
| 2011/0239421 A1 | 10/2011 | Tertitski et al. |
| 2013/0088872 A1 | 4/2013 | Ball |
| 2013/0182245 A1 | 7/2013 | Yasunaga et al. |
| 2014/0049648 A1 | 2/2014 | Stein et al. |
| 2014/0204385 A1 | 7/2014 | Ouyang et al. |
| 2015/0090291 A1 | 4/2015 | Na et al. |
| 2017/0371066 A1 | 12/2017 | Albert et al. |
| 2018/0017680 A1 | 1/2018 | Pennecot et al. |
| 2018/0217242 A1 | 8/2018 | Lombrozo et al. |
| 2018/0265048 A1 | 9/2018 | Schmidt |
| 2018/0272998 A1 | 9/2018 | Schmidt |
| 2018/0284268 A1 | 10/2018 | McWhirter |
| 2018/0284286 A1 | 10/2018 | Eichenholz et al. |
| 2019/0018131 A1 | 1/2019 | Luders et al. |

* cited by examiner

METHODS AND SYSTEMS FOR DETECTING SENSOR OCCLUSIONS

CROSS-REFERENCE TO RELATED APPLICATION

This application is a continuation application of U.S. application Ser. No. 16/242,191 filed on Jan. 8, 2019, which claims the benefit of U.S. Provisional Patent Application No. 62/755,011 filed on Nov. 2, 2018, the contents of each of which are incorporated herein by reference.

BACKGROUND

Active sensors, such as light detection and ranging (LIDAR) sensors, radio detection and ranging (RADAR) sensors, sound navigation and ranging (SONAR) sensors, among others, are sensors that can scan a surrounding environment by emitting signals toward the surrounding environment and detecting reflections of the emitted signals.

For example, a LIDAR sensor can determine distances to environmental features while scanning through a scene to assemble a "point cloud" indicative of reflective surfaces in the environment. Individual points in the point cloud can be determined, for example, by transmitting a laser pulse and detecting a returning pulse, if any, reflected from an object in the environment, and then determining a distance to the object according to a time delay between the transmission of the pulse and the reception of the reflected pulse. As a result, for example, a three-dimensional map of points indicative of locations of reflective features in the environment can be generated.

SUMMARY

In one example, a method is provided. The method involves rotating a housing of a light detection and ranging (LIDAR) device. The housing includes a first optical window and a second optical window. The method also involves transmitting a first plurality of light pulses through the first optical window to obtain a first scan of a field-of-view (FOV) of the LIDAR device. The method also involves transmitting a second plurality of light pulses through the second optical window to obtain a second scan of the FOV. The method also involves identifying, based on the first scan and the second scan, a portion of the FOV that is at least partially occluded by an occlusion.

In another example, a light detection and ranging (LIDAR) device is provided. The LIDAR device includes a housing that has a first optical window and a second optical window. The LIDAR device also includes an actuator configured to rotate the housing. The LIDAR device also includes a controller that causes the LIDAR device to perform operations. The operations comprise transmitting a first plurality of light pulses through the first optical window and a second plurality of light pulses through the second optical window. The operations also comprise obtaining a first scan of a field-of-view (FOV) of the LIDAR device based on the transmitted first plurality of light pulses, and a second scan of the FOV based on the transmitted second plurality of light pulses. The operations also comprise identifying, based on the first scan and the second scan, a portion of the FOV that is at least partially occluded by an occlusion.

In yet another example, a method is provided. The method involves receiving, from a light detection and ranging (LIDAR) device, data indicative of a first scan of a field-of-view (FOV). The first scan is based on a first plurality of light pulses transmitted through a first optical window of the LIDAR device. The method also involves receiving data indicative of a second scan of the FOV from the LIDAR device. The second scan is based on a second plurality of light pulses transmitted through a second optical window of the LIDAR device. The method also involves identifying, based on the first scan and the second scan, a portion of the FOV that is at least partially occluded by an occlusion.

In still another example, a system is provided. The system comprises means for rotating a housing of a light detection and ranging (LIDAR) device. The housing includes a first optical window and a second optical window. The system also comprises means for transmitting a first plurality of light pulses through the first optical window to obtain a first scan of a field-of-view (FOV) of the LIDAR device. The system also comprises means for transmitting a second plurality of light pulses through the second optical window to obtain a second scan of the FOV. The system also comprises means for identifying, based on the first scan and the second scan, a portion of the FOV that is at least partially occluded by an occlusion.

In still another example, a system is provided. The system comprises means for receiving, from a light detection and ranging (LIDAR) device, data indicative of a first scan of a field-of-view (FOV). The first scan is based on a first plurality of light pulses transmitted through a first optical window of the LIDAR device. The system also comprises means for receiving data indicative of a second scan of the FOV from the LIDAR device. The second scan is based on a second plurality of light pulses transmitted through a second optical window of the LIDAR device. The system also comprises means for identifying, based on the first scan and the second scan, a portion of the FOV that is at least partially occluded by an occlusion.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
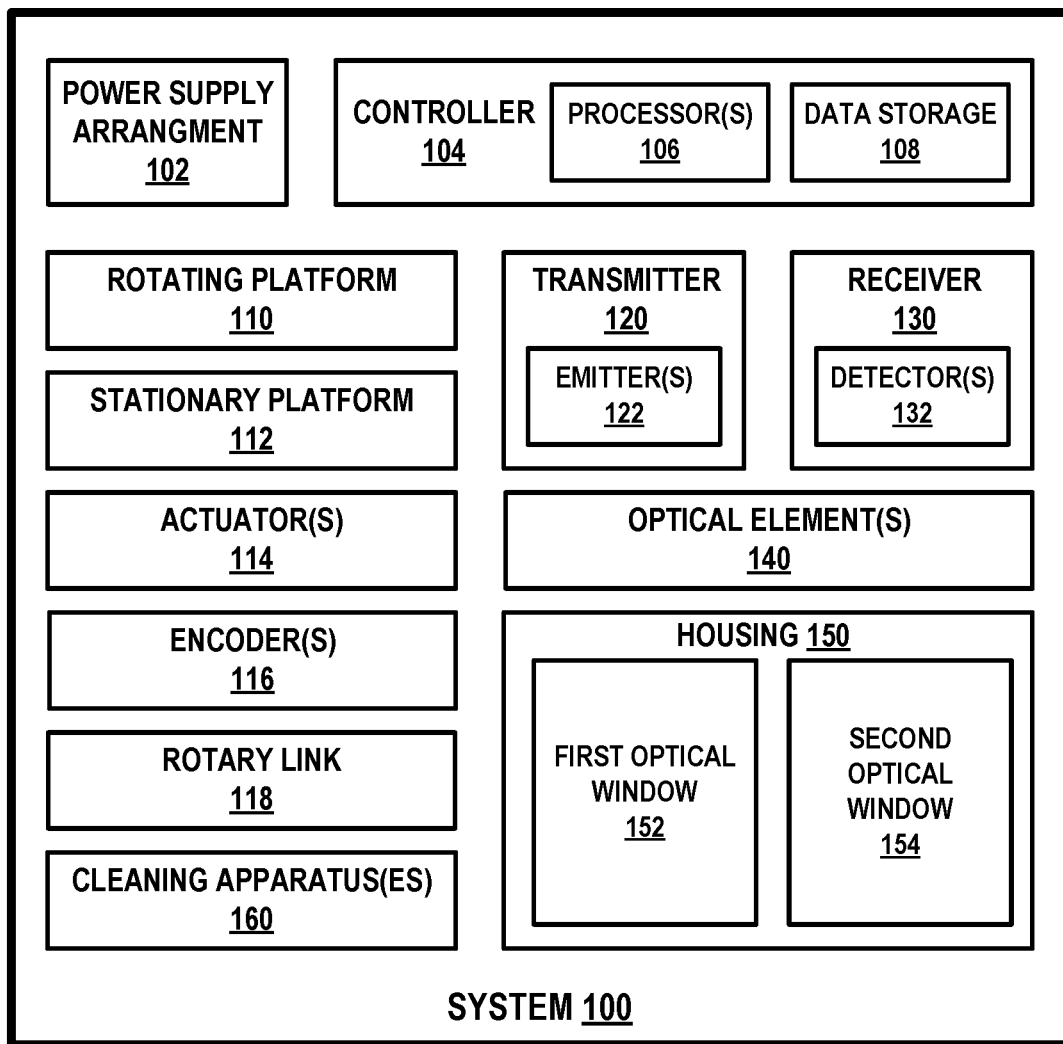
FIG. 1 is a simplified block diagram of a system, according to example embodiments.

Exemplary implementations are described herein. It should be understood that the word "exemplary" is used herein to mean "serving as an example, instance, or illustration." Any implementation or feature described herein as "exemplary" or "illustrative" is not necessarily to be construed as preferred or advantageous over other implementations or features. In the figures, similar symbols typically identify similar components, unless context dictates otherwise. The example implementations described herein are not meant to be limiting. It will be readily understood that the aspects of the present disclosure, as generally described herein and illustrated in the figures, can be arranged, substituted, combined, separated, and designed in a wide variety of different configurations.

I. Overview

In some scenarios, a FOV of an active sensor may become occluded (at least partially) by objects, obstacles, debris, dirt, scratches, deformations, and/or other types of occlusions. An occlusion may prevent one or more signals (or portions thereof) transmitted by the active sensor from reaching regions of the environment that are behind the occlusion, and/or prevent one or more signals (or portions thereof) propagating from the environment from being received by the active sensor. Some types of occlusions may be physically separated from (e.g., not attached to) the active sensor. Other types of occlusions may be disposed on or otherwise attached to the active sensor (e.g., accumulated dirt or other debris on the active sensor, etc.).

Some example implementations herein may relate to detection of sensor occlusions and/or system operations associated with the detection of such occlusions.

One example LIDAR device herein includes a housing that has a first optical window and a second optical window. The LIDAR device may be configured to transmit a first plurality of light pulses through the first optical window and a second plurality of light pulses through the second optical window. The second optical window may be located at an opposite side of the housing from the first optical window. In this way, the LIDAR device can obtain a first scan of the FOV based on the first plurality of light pulses (transmitted through the first optical window) and a second scan of the same FOV based on the second plurality of light pulses (transmitted through the second optical window). The LIDAR device may also be configured to rotate the housing. In one implementation, the LIDAR device may scan a horizontal FOV of 360 degrees by rotating the housing a complete rotation (e.g., 360 degrees) about a yaw axis of the LIDAR device. In alternative implementations, the LIDAR device may be configured to scan a different horizontal FOV (e.g., by rotating the housing less than 360 degrees about the yaw axis, etc.).

In some implementations, the LIDAR device could use the first and second optical windows to obtain two scans of the same FOV simultaneously during a single complete (360 degree) rotation of the housing. With this arrangement, the first scan and the second scan may be generally similar to one another due to an overlap of the respective scanning time periods and the respective FOVs associated with each scan. Accordingly, in some examples, the first scan can be used as a reference for validating the second scan, and vice versa. For example, by comparing the two scans, the LIDAR device could distinguish between occlusions that affect only one optical window (e.g., dirt or debris attached to the optical window, etc.) from occlusions that affect both optical windows (e.g., nearby object, tree, wall, etc.).

In some examples, the LIDAR device can detect the occlusion based on one or more scans obtained through one of the two optical windows. In one example, the LIDAR device may keep track of the numbers of light pulses transmitted toward and/or received from respective sections of the first optical window. In this example, the LIDAR device may then determine whether an occlusion that occludes a portion of the FOV associated with a particular section of the first optical window is potentially present, and/or whether the occlusion is coupled to the LIDAR device (e.g., dust disposed on the particular section, etc.). For instance, if the difference between a number of emitted light pulses transmitted toward the particular section and a number of received light pulses through the particular section increases (or exceeds a threshold), then the LIDAR device (or a computing system coupled to the LIDAR device) could determine that an occlusion may be potentially present on or near that particular section of the optical window. Alternatively or additionally, in another example, the LIDAR device (or the computing system) may be configured to detect the occlusion by monitoring light pulses transmitted and/or received through a plurality of sections of the second optical window.

In some examples, the LIDAR device may alternatively include a single optical window (instead of including both the first optical window and the second optical window). In these examples, the LIDAR device may obtain one or more scans of the environment through the single optical window (e.g., during rotation of the LIDAR device about an axis, etc.). To that end, some examples herein may involve detecting the occlusion (and/or determining whether the occlusion is physically coupled to the LIDAR device) based on one or more scans obtained through the single optical window of the LIDAR device, in line with the discussion above.

Depending on the type of occlusion, in some examples, the LIDAR device (or a system that uses the LIDAR device) could decide how to respond to the detection of the occlusion. In a first example, where the occlusion is determined to occlude only one optical window (e.g., dirt, dust, etc.), the LIDAR device may activate a cleaning mechanism (e.g., liquid spray, high-pressure gas tube, wiper, etc.) to attempt removal of the occlusion. In a second example, where the occlusion is determined to occlude both optical windows (e.g., a plastic bag covering a portion of the LIDAR device, etc.), the LIDAR device may decide to wait for a given amount of time (or a given number of rotations of the housing) for the occlusion to be removed (e.g., an occluding plastic bag may be blown away by wind), or alert a system that uses the LIDAR that the portion of the FOV is occluded, among other possibilities.

II. Example Systems and Devices

A non-exhaustive list of example sensors of the present disclosure includes LIDAR sensors, RADAR sensors, SONAR sensors, active IR cameras, and/or microwave cameras, among others. To that end, some example sensors herein may include active sensors that emit a signal (e.g., visible light signal, invisible light signal, radio-frequency signal, microwave signal, sound signal, etc.), and then detect reflections of the emitted signal from the surrounding environment.

FIG. 1 is a simplified block diagram of a system 100, according to example embodiments. As shown, system 100 includes a power supply arrangement 102, a controller 104, a rotating platform 110, a stationary platform 112, one or more actuators 114, one or more encoders 116, a rotary link 118, a transmitter 120, a receiver 130, one or more optical elements 140, a housing 150, and one or more cleaning apparatuses 160. In some embodiments, system 100 may include more, fewer, or different components. Additionally, the components shown may be combined or divided in any number of ways.

Power supply arrangement 102 may be configured to supply, receive, and/or distribute power to various components of system 100. To that end, power supply arrangement 102 may include or otherwise take the form of a power source (e.g., battery cells, etc.) disposed within system 100 and connected to various components of the system 100 in any feasible manner, so as to supply power to those components. Additionally or alternatively, power supply arrangement 102 may include or otherwise take the form of a power adapter configured to receive power from one or more external power sources (e.g., from a power source arranged in a vehicle to which system 100 is mounted) and to transmit the received power to various components of system 100.

Controller 104 may include one or more electronic components and/or systems arranged to facilitate certain operations of system 100. Controller 104 may be disposed within system 100 in any feasible manner. In one embodiment, controller 104 may be disposed, at least partially, within a central cavity region of rotary link 118.

In some examples, controller 104 may include or otherwise be coupled to wiring used for transfer of control signals to various components of system 100 and/or for transfer of data from various components of system 100 to controller 104. For example, the data that controller 104 receives may include sensor data indicating detections of signals by receiver 130, among other possibilities. Moreover, the control signals sent by controller 104 may operate various components of system 100, such as by controlling emission of signals by transmitter 120, controlling detection of signals by the receiver 130, and/or controlling actuator(s) 114 to rotate rotating platform 110, among other possibilities.

As shown, controller 104 may include one or more processors 106 and data storage 108. In some examples, data storage 108 may store program instructions executable by processor(s) 106 to cause system 100 to perform the various operations described herein. To that end, processor(s) 106 may comprise one or more general-purpose processors and/or one or more special-purpose processors. To the extent that controller 104 includes more than one processor, such processors could work separately or in combination. In some examples, data storage 108 may comprise one or more volatile and/or one or more non-volatile storage components, such as optical, magnetic, and/or organic storage, and data storage 108 may be optionally integrated in whole or in part with the processor(s).

In some examples, controller 104 may communicate with an external controller or the like (e.g., a computing system arranged in a vehicle to which system 100 is mounted) so as to help facilitate transfer of control signals and/or data between the external controller and the various components of system 100. Additionally or alternatively, in some examples, controller 104 may include circuitry wired to perform one or more of the operations described herein. For example, controller 104 may include one or more pulser circuits that provide pulse timing signals for triggering emission of pulses or other signals by transmitter 120. Additionally or alternatively, in some examples, controller 104 may include one or more special purpose processors, servos, or other types of controllers. For example, controller 104 may include a proportional-integral-derivative (PID) controller or other control loop feedback mechanism that operates actuator(s) 114 to cause the rotating platform to rotate at a particular frequency or phase. Other examples are possible as well.

Rotating platform 110 may be configured to rotate about an axis. To that end, rotating platform 110 can be formed from any solid material suitable for supporting one or more components mounted thereon. For example, transmitter 120 and receiver 130 may be arranged on rotating platform 110 such that each of these components moves relative to the environment based on rotation of rotating platform 110. In particular, these components could be rotated about an axis so that system 100 may obtain information from various directions. For instance, where the axis of rotation is a vertical axis, a pointing direction of system 100 can be adjusted horizontally by actuating the rotating platform 110 about the vertical axis.

Stationary platform 112 may take on any shape or form and may be configured for coupling to various structures, such as to a top of a vehicle, a robotic platform, assembly line machine, or any other system that employs system 100 to scan its surrounding environment, for example. Also, the coupling of the stationary platform may be carried out via any feasible connector arrangement (e.g., bolts, screws, etc.).

Actuator(s) 114 may include motors, pneumatic actuators, hydraulic pistons, and/or piezoelectric actuators, and/or any other types of actuators. In one example, actuator(s) 114 may include a first actuator configured to actuate the rotating platform 110 about the axis of rotation of rotating platform 110. In another example, actuator(s) 114 may include a second actuator configured to rotate one or more components of system 100 about a different axis of rotation. For instance, the second actuator may rotate an optical element (e.g., mirror, etc.) about a second axis (e.g., horizontal axis, etc.) to adjust a direction of an emitted light pulse (e.g., vertically, etc.). In yet another example, actuator(s) 114 may include a third actuator configured to tilt (or otherwise move) one or more components of system 100. For instance, the third actuator can be used to move or replace a filter or other type of optical element 140 along an optical path of an emitted light pulse, or can be used to tilt rotating platform (e.g., to adjust the extents of a field-of-view (FOV) scanned by system 100, etc.), among other possibilities.

Encoder(s) 116 may include any type of encoder (e.g., mechanical encoders, optical encoders, magnetic encoders, capacitive encoders, etc.). In general, encoder(s) 116 may be configured to provide rotational position measurements of a device that rotates about an axis. In one example, encoder(s) 116 may include a first encoder coupled to rotating platform 110 to measure rotational positions of platform 110 about an axis of rotation of platform 110. In another example, encoder(s) 116 may include a second encoder coupled to a mirror (or other optical element 140) to measure rotational positions of the mirror about an axis of rotation of the mirror.

Rotary link 118 directly or indirectly couples stationary platform 112 to rotating platform 110. To that end, rotary link 118 may take on any shape, form and material that provides for rotation of rotating platform 110 about an axis relative to the stationary platform 112. For instance, rotary link 118 may take the form of a shaft or the like that rotates based on actuation from actuator(s) 114, thereby transferring mechanical forces from actuator(s) 114 to rotating platform 110. In one implementation, rotary link 118 may have a central cavity in which one or more components of system 100 may be disposed. In some examples, rotary link 118 may also provide a communication link for transferring data and/or instructions between stationary platform 112 and rotating platform 110 (and/or components thereon such as transmitter 120 and receiver 130).

Transmitter 120 may be configured to transmit signals toward an environment of system 100. As shown, transmitter 120 may include one or more emitters 122. Emitters 122 may include various types of emitters depending on a configuration of system 100. In a first example, where system 100 is configured as a LIDAR device, transmitter 120 may include one or more light emitters 122 that emit one or more light beams and/or pulses having wavelengths within a wavelength range. The wavelength range could be, for example, in the ultraviolet, visible, and/or infrared portions of the electromagnetic spectrum. In some examples, the wavelength range can be a narrow wavelength range, such as that provided by lasers. A non-exhaustive list of example light emitters 122 includes laser diodes, diode bars, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), fiber lasers, and/or any other device configured to selectively transmit, reflect, and/or emit light to provide a plurality of emitted light beams and/or pulses.

In a second example, where system 100 is configured as an active infrared (IR) camera, transmitter 120 may include one or more emitters 122 configured to emit IR radiation to illuminate a scene. To that end, transmitter 120 may include any type of emitter (e.g., light source, etc.) configured to provide the IR radiation.

In a third example, where system 100 is configured as a RADAR device, transmitter 120 may include one or more antennas, waveguides, and/or other type of RADAR signal emitters 122, that are configured to emit and/or direct modulated radio-frequency (RF) signals toward an environment of system 100.

In a fourth example, where system 100 is configured as a SONAR device, transmitter 120 may include one or more acoustic transducers, such as piezoelectric transducers, magnetostrictive transducers, electrostatic transducers, and/or other types of SONAR signal emitters 122, that are configured to emit a modulated sound signal toward an environment of system 100. In some implementations, the acoustic transducers can be configured to emit sound signals within a particular wavelength range (e.g., infrasonic, ultrasonic, etc.). Other examples are possible as well.

In some implementations, system 100 (and/or transmitter 120) can be configured to emit a plurality of signals (e.g., light beams, IR signals, RF waves, sound waves, etc.) in a relative spatial arrangement that defines a FOV of system 100. For example, each beam (or signal) may be configured to propagate toward a portion of the FOV. In this example, multiple adjacent (and/or partially overlapping) beams may be directed to scan multiple respective portions of the FOV during a scan operation performed by system 100. Other examples are possible as well.

Receiver 130 may include one or more detectors 132 configured to detect reflections of the signals emitted by transmitter 120.

In a first example, where system 100 is configured as a RADAR device, receiver 130 may include one or more antennas (i.e., detectors 132) configured to detect reflections of the RF signal transmitted by transmitter 120. To that end, in some implementations, the one or more antennas of transmitter 120 and receiver 130 can be physically implemented as the same physical antenna structures.

In a second example, where system 100 is configured as a SONAR device, receiver 130 may include one or more sound sensors 110 (e.g., microphones, etc.) that are configured to detect reflections of the sound signals emitted by transmitter 120.

In a third example, where system 100 is configured as an active IR camera, receiver 130 may include one or more light detectors 132 (e.g., charge-coupled devices (CCDs), etc.) that are configured to detect a source wavelength of IR light transmitted by transmitter 120 and reflected off a scene toward receiver 130.

In a fourth example, where system 100 is configured as a LIDAR device, receiver 130 may include one or more light detectors 132 arranged to intercept and detect reflections of the light pulses or beams emitted by transmitter 120 that return to system 100 from the environment. Example light detectors 132 may include photodiodes, avalanche photodiodes (APDs), silicon photomultipliers (SiPMs), single photon avalanche diodes (SPADs), multi-pixel photon counters (MPPCs), phototransistors, cameras, active pixel sensors (APS), charge coupled devices (CCD), cryogenic detectors, and/or any other sensor of light. In some instances, receiver 130 may be configured to detect light having wavelengths in the same wavelength range as the light emitted by transmitter 120. In this way, for instance, system 100 may distinguish received light originated by system 100 from other light originated by external sources in the environment.

In some implementations, receiver 130 may include a detector comprising an array of sensing elements connected to one another. For instance, where system 100 is configured as a LIDAR device, multiple light sensing elements could be connected in parallel to provide a photodetector array having a larger light detection area (e.g., combination of the sensing surfaces of the individual detectors in the array, etc.) than a detection area of a single sensing element. The photodetector array could be arranged in a variety ways. For instance, the individual detectors of the array can be disposed on one or more substrates (e.g., printed circuit boards (PCBs), flexible PCBs, etc.) and arranged to detect incoming light that is traveling along an optical path of an optical lens of system 100 (e.g., optical element(s) 140). Also, such a photodetector array could include any feasible number of detectors arranged in any feasible manner.

In some examples, system 100 can select or adjust a horizontal scanning resolution by changing a rate of rotation of system 100 (and/or transmitter 120 and receiver 130). Additionally or alternatively, the horizontal scanning resolution can be modified by adjusting a pulse rate of signals emitted by transmitter 120. In a first example, transmitter 120 may be configured to emit pulses at a pulse rate of 15,650 pulses per second, and to rotate at 10 Hz (i.e., ten complete 360° rotations per second) while emitting the pulses. In this example, receiver 130 may have a 0.23° horizontal angular resolution (e.g., horizontal angular separation between consecutive pulses). In a second example, if system 100 is instead rotated at 20 Hz while maintaining the pulse rate of 15,650 pulses per second, then the horizontal angular resolution may become 0.46°. In a third example, if transmitter 120 emits the pulses at a rate of 31,300 pulses per second while maintaining the rate of rotation of 10 Hz, then the horizontal angular resolution may become 0.115°. In some examples, system 100 can be alternatively configured to scan a particular range of views within less than a complete 360° rotation of system 100. Other implementations are possible as well.

It is noted that the pulse rates, angular resolutions, rates of rotation, and viewing ranges described above are only for the sake of example, and thus each of these scanning characteristics could vary according to various applications of system 100.

Optical element(s) 140 can be optionally included in or otherwise coupled to transmitter 120 and/or receiver 130. In one example, optical element(s) 140 can be arranged to direct light emitted by emitter(s) 122 toward a scene (or a region therein). In another example, optical element(s) 140 can be arranged to focus light from the scene (or a region therein) toward detector(s) 132. As such, optical element(s) 140 may include any feasible combination of optical elements, such as filters, apertures, mirror(s), waveguide(s), lens(es), or other types optical components, that are arranged to guide propagation of light through physical space and/or to adjust a characteristic of the light.

In some examples, controller 104 could operate actuator 114 to rotate rotating platform 110 in various ways so as to obtain information about the environment. In one example, rotating platform 110 could be rotated in either direction. In another example, rotating platform 110 may carry out complete revolutions such that system 100 scans a 360° view of the environment. Moreover, rotating platform 110 could rotate at various frequencies so as to cause system 100 to scan the environment at various refresh rates. In one embodiment, system 100 may be configured to have a refresh rate of 10 Hz (e.g., ten complete rotations of system 100 per second). Other refresh rates are possible.

Alternatively or additionally, system 100 may be configured to adjust the pointing direction of an emitted signal (emitted by transmitter 120) in various ways. In one implementation, signal emitters (e.g., light sources, antennas, acoustic transducers, etc.) of transmitter 120 can be operated according to a phased array configuration or other type of beam steering configuration.

In a first example, where system 100 is configured as a LIDAR device, light sources or emitters in transmitter 120 can be coupled to phased array optics that control the phase of light waves emitted by the light sources. For instance, controller 104 can be configured to adjust the phased array optics (e.g., phased array beam steering) to change the effective pointing direction of a light signal emitted by transmitter 120 (e.g., even if rotating platform 110 is not rotating).

In a second example, where system 100 is configured as a RADAR device, transmitter 120 may include an array of antennas, and controller 104 can provide respective phase-shifted control signals for each individual antenna in the array to modify a pointing direction of a combined RF signal from the array (e.g., phased array beam steering).

In a third example, where system 100 is configured as a SONAR device, transmitter 120 may include an array of acoustic transducers, and controller 104 can similarly operate the array of acoustic transducers (e.g., via phase-shifted control signals, phased array beam steering, etc.) to achieve a target pointing direction of a combined sound signal emitted by the array (e.g., even if rotating platform 110 is not rotating, etc.).

Housing 150 may take on any shape, form, and material and may be configured to house one or more components of system 100. In one example, housing 150 can be a dome-shaped housing. Further, in some examples, housing 150 may be composed of or may include a material that is at least partially non-transparent, which may allow for blocking of at least some signals from entering the interior space of the housing 150 and thus help mitigate thermal and noise effects of ambient signals on one or more components of system 100. Other configurations of housing 150 are possible as well.

In some examples, housing 150 may be coupled to rotating platform 110 such that housing 150 is configured to rotate based on rotation of rotating platform 110. In these examples, transmitter 120, receiver 130, and possibly other components of system 100 may each be disposed within housing 150. In this manner, transmitter 120 and receiver 130 may rotate along with housing 150 while being disposed within housing 150. In other examples, housing 150 may be coupled to stationary platform 112 or other structure such that housing 150 does not rotate with the other components rotated by rotating platform 110.

As shown, housing 150 can optionally include a first optical window 152 and a second optical window 154. Thus, in some examples, housing 150 may define an optical cavity in which one or more components disposed inside the housing (e.g., transmitter 120, receiver 130, etc.) are optically isolated from external light in the environment, except for light that propagates through optical windows 152 and 154. With this arrangement for instance, system 100 (e.g., in a LIDAR configuration, etc.) may reduce interference from external light (e.g., noise, etc.) with signals transmitted by transmitter 120 and/or reflections of the transmitted signal received by receiver 130.

To that end, in some embodiments, optical windows 152 and 154 may include a material that is transparent to the wavelengths of light emitted by emitters 122 and/or one or more other wavelengths. For example, each of optical windows 152 and 154 may be formed from a glass substrate or a plastic substrate, among others. Additionally, in some examples, each of optical windows 152 and 154 may include or may be coupled to a filter that selectively transmits wavelengths of light transmitted by emitter(s) 122, while reducing transmission of other wavelengths. Optical windows 152 and 154 may have various thicknesses. In one embodiment, optical windows 152 and 154 may have a thickness between 1 millimeter and 2 millimeters. Other thicknesses are possible as well.

In some examples, second optical window 154 may be located at an opposite side of housing 150 from first optical window 152.

Cleaning apparatus(es) 160 can be optionally included in system 100 to facilitate cleaning one or more components (e.g., optical element(s) 140, etc.) of system 100. To that end, cleaning apparatus 160 may include one or more cleaning mechanisms. A first example cleaning apparatus 160 may include a liquid spray configured to deposit liquid on one or more components of system 100 (e.g., optical element(s) 140, housing 150, etc.). For instance, the liquid can be applied to attempt dissolving or mechanically removing an occlusion (e.g., dirt, dust, etc.) disposed on a surface of an optical component. A second example cleaning apparatus 160 may include a high-pressure gas pump configured to apply gas onto an occlusion on a surface of an optical component. A third example cleaning apparatus 160 may include a wiper (e.g., similar to a windshield wiper) configured to attempt removing an occlusion from a surface of a component in system 100. Other examples are possible.

It is noted that this arrangement of system 100 is described for exemplary purposes only and is not meant to be limiting. As noted above, in some examples, system 100 can be alternatively implemented with fewer components than those shown. In one example, system 100 can be implemented without rotating platform 100. For instance, transmitter 120 can be configured to transmit a plurality of signals spatially arranged to define a particular FOV of system 100 (e.g., horizontally and vertically) without necessarily rotating transmitter 120 and receiver 130. In another example, housing 150 may be configured to include a single optical window (instead of two optical windows 152, 154). For instance, in a LIDAR implementation of system 100, LIDAR 100 may obtain a single complete scan of a FOV during a given scan period by transmitting light pulses through the single optical window only (i.e., instead of obtaining two scans of the same FOV simultaneously by transmitting light pulses through two separate optical windows). Other examples are possible as well.

Figure 2A:
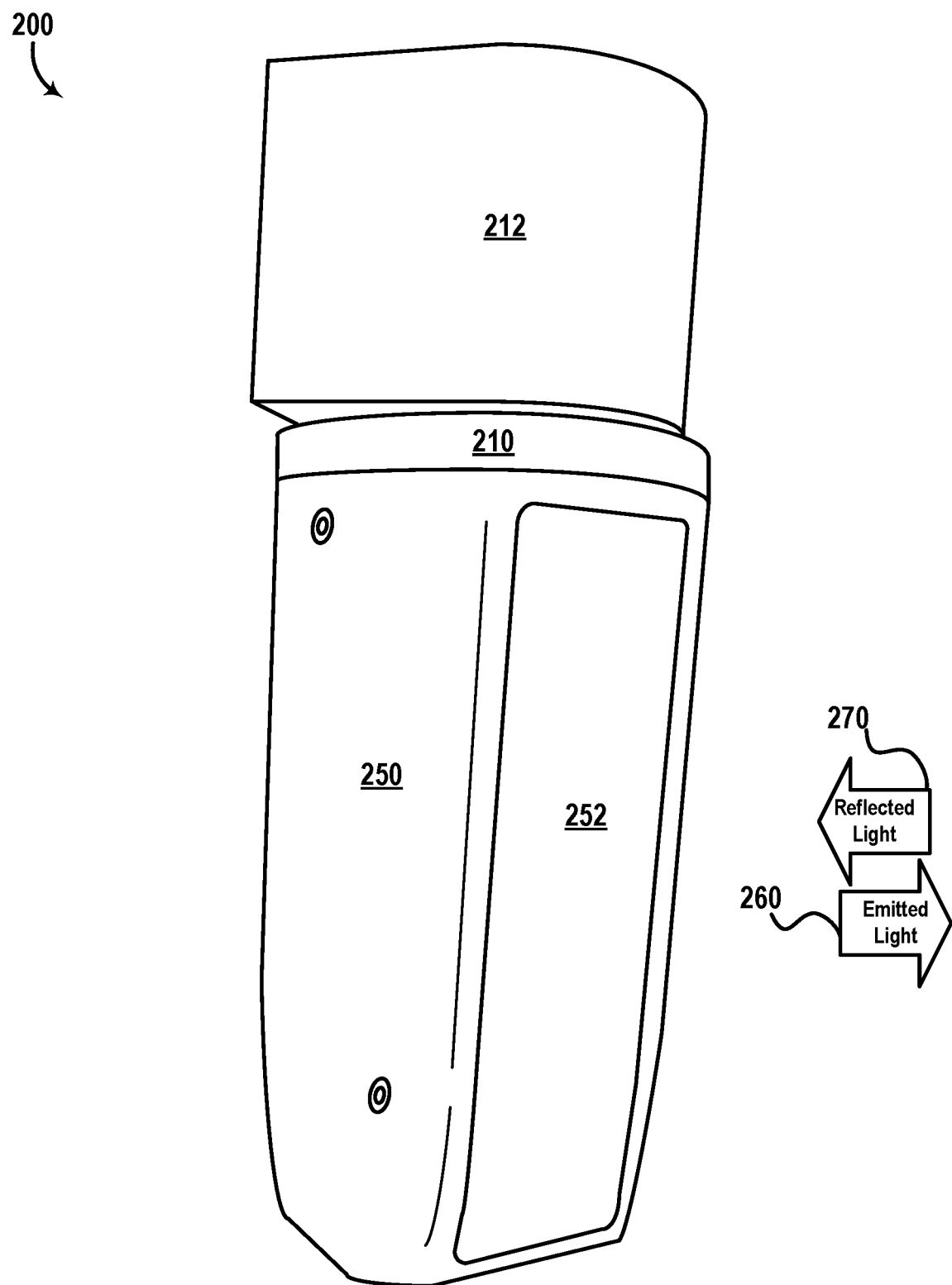
FIG. 2A illustrates a LIDAR device, according to example embodiments.

FIG. 2A illustrates a LIDAR device 200, according to example embodiments. As shown, LIDAR 200 includes a rotating platform 210, a stationary platform 212, and a housing 250 that are similar, respectively, to rotating platform 110, stationary platform 112, and housing 150 of system 100.

LIDAR 200 may be configured to scan an environment by emitting light 260 toward the environment, and detecting reflect portions (e.g., reflected light 270) of the emitted light returning to LIDAR 200 from the environment. Further, to adjust a FOV scanned by LIDAR 200 (i.e., the region illuminated by emitted light 260), rotating platform 210 may be configured to rotate housing 250 (and one or more components included therein) about an axis of rotation of rotating platform 210. For instance, where the axis of rotation of platform 210 is a vertical axis, rotating platform 210 may adjust the direction of emitted light 260 horizontally to define the horizontal extents of the FOV of LIDAR 200.

As shown, LIDAR 200 also includes an optical window 252 through which emitted light 260 is transmitted out of housing 250, and through which reflected light 270 enters into housing 250. Although not shown, housing 250 may also include another optical window located at an opposite side of housing 250 from optical window 252. Thus, housing 250 may define an optical cavity in which one or more components disposed inside the housing (e.g., transmitter, receiver, etc.) are optically isolated from external light in the environment, except for light that propagates through one or more optical windows. With this arrangement for instance, LIDAR 200 may reduce interference from external light (e.g., noise, etc.) with transmitted signals 260 and/or reflected signals 270.

To that end, in some embodiments, optical window 252 may include a material that is transparent to the wavelengths of emitted light 270 and/or one or more other wavelengths. For example, optical window 252 may be formed from a glass substrate or a plastic substrate, among others. Additionally, in some examples, optical window 252 may include or may be coupled to a filter that selectively transmits wavelengths of emitted light 260, while reducing transmission of other wavelengths through the optical window 252. Optical window 252 may have various thicknesses. In one embodiment, optical window 252 may have a thickness between 1 millimeter and 2 millimeters. Other thicknesses are possible.

Figure 2B:
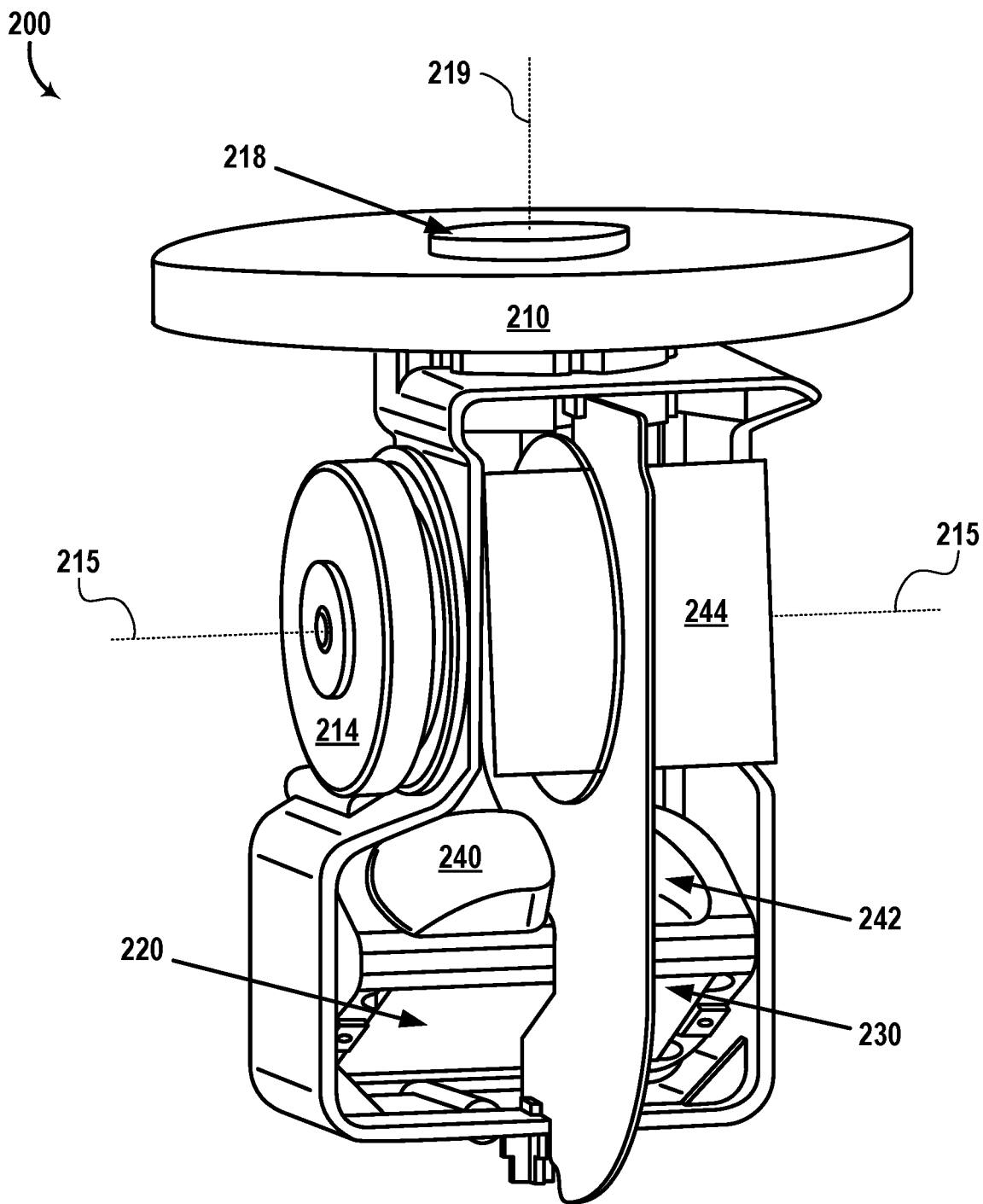
FIG. 2B illustrates a partial perspective view of the LIDAR device.

FIG. 2B illustrates a partial cross-section view of LIDAR 200. It is noted that some of the components of LIDAR 200 (e.g., platform 212, housing 250, and optical window 252) are omitted from the illustration of FIG. 2B for convenience in description.

As shown in FIG. 2B, LIDAR device 200 also includes actuators 214 and 218, which may be similar to actuators 114 of system 100. Additionally, as shown, LIDAR 200 includes a transmitter 220 and a receiver 230, which may be similar, respectively, to transmitter 120 and receiver 130 of system 100. Additionally, as shown, LIDAR 200 includes one or more optical elements (i.e., a transmit lens 240, a receive lens 242, and a mirror 244), which may be similar to optical elements 140 of system 100.

Actuators 214 and 218 may include a stepper motor, an electric motor, a combustion motor, a pancake motor, a piezoelectric actuator, or any other type of actuator, such as those describe for actuators 114 of system 100.

As shown, actuator 214 may be configured to rotate the mirror 244 about a first axis 215, and actuator 218 may be configured to rotate rotating platform 210 about a second axis 219. In some embodiments, axis 215 may correspond to a horizontal axis of LIDAR 200 and axis 219 may correspond to a vertical axis of LIDAR 200 (e.g., axes 215 and 219 may be aligned substantially perpendicular to one another).

In an example operation, LIDAR transmitter 220 may emit light (via transmit lens 240) that reflects off mirror 244 to propagate away from LIDAR 200 (e.g., as emitted light 260 shown in FIG. 2A). Further, received light from the environment of LIDAR 200 (including light 270 shown in FIG. 2A) may be reflected off mirror 244 toward LIDAR receiver 230 (via lens 242). Thus, for instance, a vertical scanning direction of LIDAR 200 can be controlled by rotating mirror 244 (e.g., about a horizontal axis 215), and a horizontal scanning direction of LIDAR 200 can be controlled by rotating LIDAR 200 about a vertical axis (e.g., axis 219) using rotating platform 210.

In this example, mirror 244 could be rotated while transmitter 220 is emitting a series of light pulses toward the mirror. Thus, depending on the rotational position of the mirror about axis 215, each light pulse could thus be steered (e.g., vertically). As such, LIDAR 200 may scan a vertical FOV defined by a range of (vertical) steering directions provided by mirror 244 (e.g., based on a range of angular positions of mirror 244 about axis 215). In some examples, LIDAR 200 may be configured to rotate mirror 244 one or more complete rotations to steer emitted light from transmitter 220 (vertically). In other examples, LIDAR device 200 may be configured to rotate mirror 244 within a given range of angles to steer the emitted light over a particular range of directions (vertically). Thus, LIDAR 200 may scan a variety of vertical FOVs by adjusting the rotation of mirror 244. In one embodiment, the vertical FOV of LIDAR 200 is 110°.

Continuing with this example, platform 210 may be configured to rotate the arrangement of components supported thereon (e.g., mirror 244, motor 214, lenses 230 and 232, transmitter 220, and receiver 230) about a vertical axis (e.g., axis 219). Thus, LIDAR 200 may rotate platform 210 to steer emitted light (from transmitter 220) horizontally (e.g., about the axis of rotation 219 of platform 210). Additionally, the range of the rotational positions of platform 210 (about axis 219) can be controlled to define a horizontal FOV of LIDAR 200. In one embodiment, platform 210 may rotate within a defined range of angles (e.g., 270°, etc.) to provide a horizontal FOV that is less than 360°. However, other amounts of rotation are possible as well (e.g., 360°, 8°, etc.) to scan any horizontal FOV.

Figure 2C:
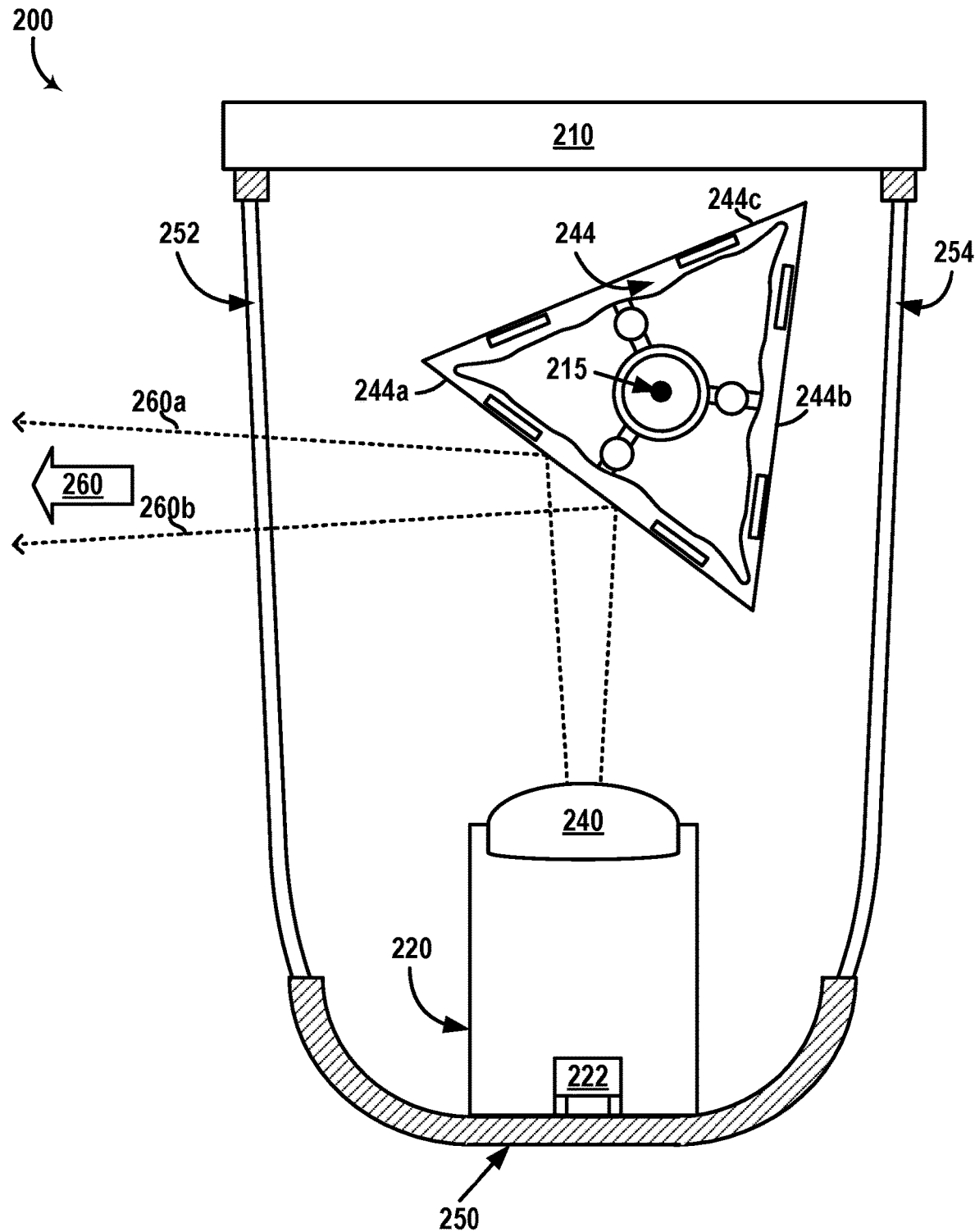
FIG. 2C illustrates a partial cross-section view of the LIDAR device.

FIG. 2C illustrates a partial cross-section view of LIDAR device 200. It is noted that some of the components of LIDAR 200 are omitted from the illustration of FIG. 2C for convenience in description. In the cross-section view of FIG. 2C, axis 215 may be perpendicular to (and may extend through) the page.

As shown in FIG. 2C, LIDAR 200 also includes a second optical window 254 that is positioned opposite to optical window 252. Optical window 254 may be similar to optical window 252. For example, optical window 254 may be configured to transmit light into and/or out of the optical cavity defined by housing 250.

As shown in FIG. 2C, transmitter 220 includes an emitter 222, which may include any of the light sources described for emitter(s) 122, for instance. In alternative embodiments, transmitter 220 may include more than one light source. Emitter 222 may be configured to emit one or more light pulses 260 (e.g., laser beams, etc.). Transmit lens 240 may be configured to direct (and/or collimate) the emitted light from emitter 222 toward mirror 244. For example, transmit lens 240 may collimate the light from the emitter to define a beam width of the light beam 260 transmitted out of LIDAR 200 (e.g., the beam divergence angle between dotted lines 260a and 260b).

As shown in FIG. 2C, mirror 244 may include three reflective surfaces 244a, 244b, 244c (e.g., triangular mirror). In alternative examples, mirror 244 may instead include additional or fewer reflective surfaces. In the example shown, the emitted light transmitted through transmit lens 240 may then reflect off reflective surface 244a toward the environment of LIDAR 200 in the direction illustrated by arrow 260. Thus, in this example, as mirror 244 is rotated (e.g., about axis 215), emitted light 260 may be steered to have a different direction (e.g., pitch direction, etc.) than that illustrated by arrow 260. For example, the direction 260 of the emitted light could be adjusted based on the rotational position of triangular mirror 244.

Additionally, in some examples, emitted light 260 may be steered out of housing 250 through optical window 252 or through optical window 254 depending on the rotational position of mirror 244 about axis 215. Thus, in some examples, LIDAR 200 may be configured to steer emitted light beam 260 within a wide range of directions (e.g., vertically), and/or out of either side of housing 250 (e.g., the sides where optical windows 252 and 252 are located).

Figure 2D:
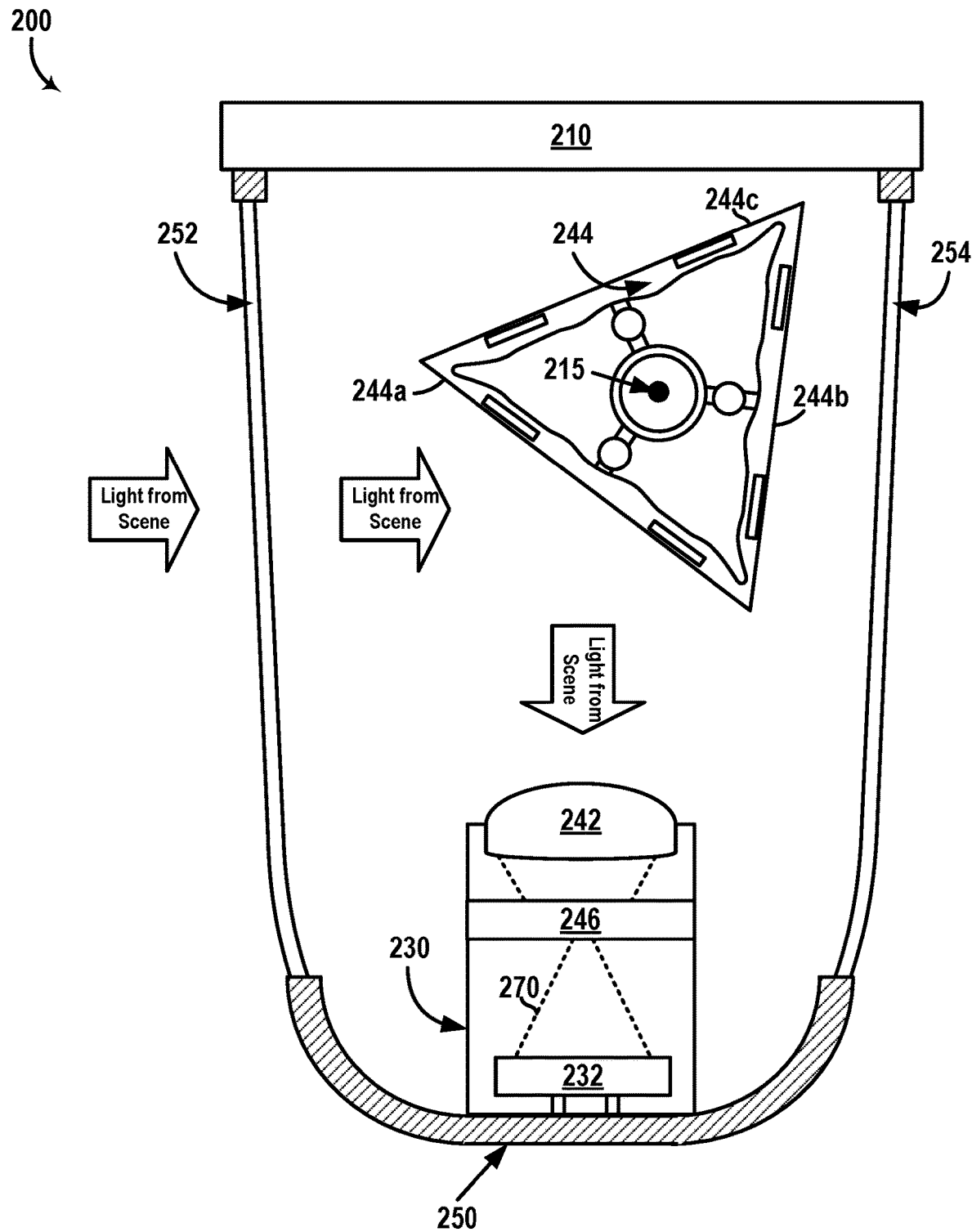
FIG. 2D illustrates another partial cross-section view of the LIDAR device.

FIG. 2D illustrates another partial cross-section view of LIDAR device 200. It is noted that some of the components of LIDAR 200 are omitted from the illustration of FIG. 2D for convenience in description. As shown, receiver 230 includes one or more light detectors 232, which may be similar to detector(s) 112 of system 100. Further, as shown, receiver 230 includes a diaphragm 246 between receive lens 246 and detector(s) 232.

Diaphragm 246 may include one or more optical elements (e.g., aperture stop, filter, etc.) configured to select a portion the light focused by receive lens 242 for transmission toward detector(s) 232.

For example, receive lens 242 may be configured to focus light received from the scene scanned by LIDAR 200 (e.g., light from the scene that enters window 252 or window 254 and is reflected by mirror 244) toward diaphragm 246. In line with the discussion above, detector(s) 232 may be arranged (or aligned) to intercept a portion of the focused light that includes light from the target region illuminated by transmitter 220. To facilitate this, for example, diaphragm 246 may include an aperture positioned and/or sized to transmit the portion of the focused light associated with the target region through the aperture as diverging light (e.g., including reflected light 270) for detection by detector(s) 232.

It is noted that the various positions, shapes, and sizes of the various components of LIDAR 200, the light beams emitted by LIDAR 200, and/or the light beams received by LIDAR 200 may vary and are not necessarily to scale, but are illustrated as shown in FIGS. 2A-2D for convenience in description. Additionally, it is noted that LIDAR 200 may alternatively include additional, fewer, or different components than those shown in FIGS. 2A-2D.

In one alternative implementation, housing 250 may be configured to include a single optical window (instead of two optical windows 252 and 254). For example, LIDAR 200 may be configured to obtain a single complete scan of the FOV of LIDAR 200 during each rotation of the housing 250 across the range of yaw angles associated with the horizontal extents of the FOV of LIDAR 200. In this example, LIDAR 200 may be configured to transmit light pulses through the single optical window during the rotation of housing 250 to obtain a single scan of the FOV during a given scan period (i.e., instead of obtaining two scans of the same FOV by transmitting light pulses through two separate optical windows simultaneously over the given scan period).

In another alternative implementation, LIDAR 200 may include a beam-steering apparatus comprising one or more optical components instead of or in addition to mirror 244. In this implementation, LIDAR 200 may be configured to scan the scene by steering the transmitted and/or received light beams through optical windows 252 and/or 254 using various arrangements of beam-steering optical elements.

Some example implementations herein involve a vehicle includes at least one sensor, such as system 100, device 200, and/or other types of sensors (e.g., RADARs, SONARs, cameras, other active sensors, etc.). However, an example sensor disclosed herein can also be used for various other purposes and may be incorporated in or otherwise connected to any feasible system or arrangement. For instance, an example LIDAR device herein can be used in an assembly line setting to monitor objects (e.g., products) being manufactured in the assembly line. Other examples are possible as well.

Some example LIDAR devices herein may be used with any type of vehicle, including conventional automobiles as well as automobiles having an autonomous or semi-autonomous mode of operation. Further, the term "vehicle" is to be broadly construed to cover any moving object, including, for instance, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, etc.

Figure 3:
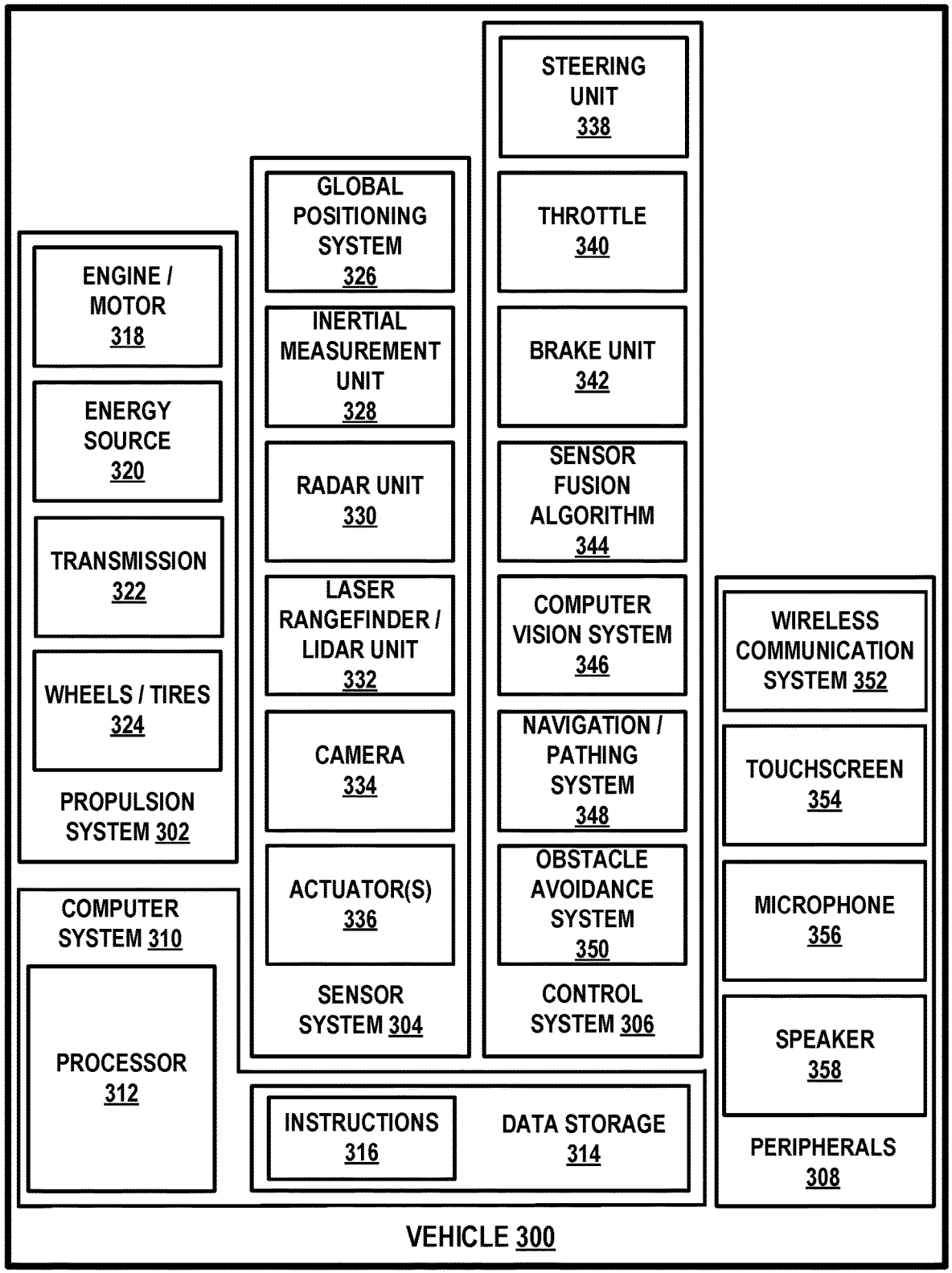
FIG. 3 is a simplified block diagram of a vehicle, according to example embodiments.

FIG. 3 is a simplified block diagram of a vehicle 300, according to an example embodiment. As shown, the vehicle 300 includes a propulsion system 302, a sensor system 304, a control system 306, peripherals 308, and a computer system 310. In some embodiments, vehicle 300 may include more, fewer, or different systems, and each system may include more, fewer, or different components. Additionally, the systems and components shown may be combined or divided in any number of ways. For instance, control system 306 and computer system 310 may be combined into a single system.

Propulsion system 302 may be configured to provide powered motion for the vehicle 300. To that end, as shown, propulsion system 302 includes an engine/motor 318, an energy source 320, a transmission 322, and wheels/tires 324.

The engine/motor 318 may be or include any combination of an internal combustion engine, an electric motor, a steam engine, and a Sterling engine. Other motors and engines are possible as well. In some embodiments, propulsion system 302 may include multiple types of engines and/or motors.

For instance, a gas-electric hybrid car may include a gasoline engine and an electric motor. Other examples are possible.

Energy source 320 may be a source of energy that powers the engine/motor 318 in full or in part. That is, engine/motor 318 may be configured to convert energy source 320 into mechanical energy. Examples of energy sources 320 include gasoline, diesel, propane, other compressed gas-based fuels, ethanol, solar panels, batteries, and other sources of electrical power. Energy source(s) 320 may additionally or alternatively include any combination of fuel tanks, batteries, capacitors, and/or flywheels. In some embodiments, energy source 320 may provide energy for other systems of the vehicle 300 as well. To that end, energy source 320 may additionally or alternatively include, for example, a rechargeable lithium-ion or lead-acid battery. In some embodiments, energy source 320 may include one or more banks of batteries configured to provide the electrical power to the various components of vehicle 300.

Transmission 322 may be configured to transmit mechanical power from the engine/motor 318 to the wheels/tires 324. To that end, transmission 322 may include a gearbox, clutch, differential, drive shafts, and/or other elements. In embodiments where the transmission 322 includes drive shafts, the drive shafts may include one or more axles that are configured to be coupled to the wheels/tires 324.

Wheels/tires 324 of vehicle 300 may be configured in various formats, including a unicycle, bicycle/motorcycle, tricycle, or car/truck four-wheel format. Other wheel/tire formats are possible as well, such as those including six or more wheels. In any case, wheels/tires 324 may be configured to rotate differentially with respect to other wheels/tires 324. In some embodiments, wheels/tires 324 may include at least one wheel that is fixedly attached to the transmission 322 and at least one tire coupled to a rim of the wheel that could make contact with the driving surface. Wheels/tires 324 may include any combination of metal and rubber, or combination of other materials. Propulsion system 302 may additionally or alternatively include components other than those shown.

Sensor system 304 may include a number of sensors configured to sense information about an environment in which the vehicle 300 is located, as well as one or more actuators 336 configured to modify a position and/or orientation of the sensors. As shown, sensor system 304 includes a Global Positioning System (GPS) 326, an inertial measurement unit (IMU) 328, a RADAR unit 330, a laser rangefinder and/or LIDAR unit 332, and a camera 334. Sensor system 304 may include additional sensors as well, including, for example, sensors that monitor internal systems of the vehicle 300 (e.g., an $O_2$ monitor, a fuel gauge, an engine oil temperature, etc.). Other sensors are possible as well.

GPS 326 may be any sensor (e.g., location sensor) configured to estimate a geographic location of vehicle 300. To this end, the GPS 326 may include a transceiver configured to estimate a position of the vehicle 300 with respect to the Earth.

IMU 328 may be any combination of sensors configured to sense position and orientation changes of the vehicle 300 based on inertial acceleration. In some embodiments, the combination of sensors may include, for example, accelerometers, gyroscopes, compasses, etc.

RADAR unit 330 may be any sensor configured to sense objects in the environment in which the vehicle 300 is located using radio signals. In some embodiments, in addition to sensing the objects, RADAR unit 330 may additionally be configured to sense the speed and/or heading of the objects.

Similarly, laser range finder or LIDAR unit 332 may be any sensor configured to sense objects in the environment in which vehicle 300 is located using lasers. For example, LIDAR unit 332 may include one or more LIDAR devices, which may be similar to system 100 and/or device 200 among other possible LIDAR configurations.

Camera 334 may be any camera (e.g., a still camera, a video camera, etc.) configured to capture images of the environment in which the vehicle 300 is located. To that end, camera 334 may take any of the forms described above.

Control system 306 may be configured to control one or more operations of vehicle 300 and/or components thereof. To that end, control system 306 may include a steering unit 338, a throttle 340, a brake unit 342, a sensor fusion algorithm 344, a computer vision system 346, navigation or pathing system 348, and an obstacle avoidance system 350.

Steering unit 338 may be any combination of mechanisms configured to adjust the heading of vehicle 300. Throttle 340 may be any combination of mechanisms configured to control engine/motor 318 and, in turn, the speed of vehicle 300. Brake unit 342 may be any combination of mechanisms configured to decelerate vehicle 300. For example, brake unit 342 may use friction to slow wheels/tires 324. As another example, brake unit 342 may convert kinetic energy of wheels/tires 324 to an electric current.

Sensor fusion algorithm 344 may be an algorithm (or a computer program product storing an algorithm) configured to accept data from sensor system 304 as an input. The data may include, for example, data representing information sensed by sensor system 304. Sensor fusion algorithm 344 may include, for example, a Kalman filter, a Bayesian network, a machine learning algorithm, an algorithm for some of the functions of the methods herein, or any other sensor fusion algorithm. Sensor fusion algorithm 344 may further be configured to provide various assessments based on the data from sensor system 304, including, for example, evaluations of individual objects and/or features in the environment in which vehicle 300 is located, evaluations of particular situations, and/or evaluations of possible impacts based on particular situations. Other assessments are possible as well.

Computer vision system 346 may be any system configured to process and analyze images captured by camera 334 in order to identify objects and/or features in the environment in which vehicle 300 is located, including, for example, traffic signals and obstacles. To that end, computer vision system 346 may use an object recognition algorithm, a Structure from Motion (SFM) algorithm, video tracking, or other computer vision techniques. In some embodiments, computer vision system 346 may additionally be configured to map the environment, track objects, estimate the speed of objects, etc.

Navigation and pathing system 348 may be any system configured to determine a driving path for vehicle 300. Navigation and pathing system 348 may additionally be configured to update a driving path of vehicle 300 dynamically while vehicle 300 is in operation. In some embodiments, navigation and pathing system 348 may be configured to incorporate data from sensor fusion algorithm 344, GPS 326, LIDAR unit 332, and/or one or more predetermined maps so as to determine a driving path for vehicle 300.

Obstacle avoidance system 350 may be any system configured to identify, evaluate, and avoid or otherwise negotiate obstacles in the environment in which vehicle 300 is located. Control system 306 may additionally or alternatively include components other than those shown.

Peripherals 308 may be configured to allow vehicle 300 to interact with external sensors, other vehicles, external computing devices, and/or a user. To that end, peripherals 308 may include, for example, a wireless communication system 352, a touchscreen 354, a microphone 356, and/or a speaker 358.

Wireless communication system 352 may be any system configured to wirelessly couple to one or more other vehicles, sensors, or other entities, either directly or via a communication network. To that end, wireless communication system 352 may include an antenna and a chipset for communicating with the other vehicles, sensors, servers, or other entities either directly or via a communication network. The chipset or wireless communication system 352 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities.

Touchscreen 354 may be used by a user to input commands to vehicle 300. To that end, touchscreen 354 may be configured to sense at least one of a position and a movement of a user's finger via capacitive sensing, resistance sensing, or a surface acoustic wave process, among other possibilities. Touchscreen 354 may be capable of sensing finger movement in a direction parallel or planar to the touchscreen surface, in a direction normal to the touchscreen surface, or both, and may also be capable of sensing a level of pressure applied to the touchscreen surface. Touchscreen 354 may be formed of one or more translucent or transparent insulating layers and one or more translucent or transparent conducting layers. Touchscreen 354 may take other forms as well.

Microphone 356 may be configured to receive audio (e.g., a voice command or other audio input) from a user of vehicle 300. Similarly, speakers 358 may be configured to output audio to the user.

Computer system 310 may be configured to transmit data to, receive data from, interact with, and/or control one or more of propulsion system 302, sensor system 304, control system 306, and peripherals 308. To this end, computer system 310 may be communicatively linked to one or more of propulsion system 302, sensor system 304, control system 306, and peripherals 308 by a system bus, network, and/or other connection mechanism (not shown).

In one example, computer system 310 may be configured to control operation of transmission 322 to improve fuel efficiency. As another example, computer system 310 may be configured to cause camera 334 to capture images of the environment. As yet another example, computer system 310 may be configured to store and execute instructions corresponding to sensor fusion algorithm 344. As still another example, computer system 310 may be configured to store and execute instructions for determining a 3D representation of the environment around vehicle 300 using LIDAR unit 332. Thus, for instance, computer system 310 could function as a controller for LIDAR unit 332. Other examples are possible as well.

As shown, computer system 310 includes processor 312 and data storage 314. Processor 312 may comprise one or more general-purpose processors and/or one or more special-purpose processors. To the extent that processor 312 includes more than one processor, such processors could work separately or in combination.

Data storage 314, in turn, may comprise one or more volatile and/or one or more non-volatile storage components, such as optical, magnetic, and/or organic storage, and data storage 314 may be integrated in whole or in part with processor 312. In some embodiments, data storage 314 may contain instructions 316 (e.g., program logic) executable by processor 312 to cause vehicle 300 and/or components thereof (e.g., LIDAR unit 332, etc.) to perform the various operations described herein. Data storage 314 may contain additional instructions as well, including instructions to transmit data to, receive data from, interact with, and/or control one or more of propulsion system 302, sensor system 304, control system 306, and/or peripherals 308.

In some embodiments, vehicle 300 may include one or more elements in addition to or instead of those shown. For example, vehicle 300 may include one or more additional interfaces and/or power supplies. Other additional components are possible as well. In such embodiments, data storage 314 may also include instructions executable by processor 312 to control and/or communicate with the additional components. Still further, while each of the components and systems are shown to be integrated in vehicle 300, in some embodiments, one or more components or systems may be removably mounted on or otherwise connected (mechanically or electrically) to vehicle 300 using wired or wireless connections. Vehicle 300 may take other forms as well.

III. Example Methods

It is noted that the example arrangement described for LIDAR 200 is not meant to be limiting. Thus, the methods and processes described herein can be used with a variety of different LIDAR configurations, including LIDAR device 200 as well as other LIDAR arrangements. Additionally, the methods and processes described herein can be used with a variety of different types of active sensors such as any of the active sensing systems in the description of system 100 (e.g., SONARs, RADARs, LIDARs, etc.).

Figure 4:
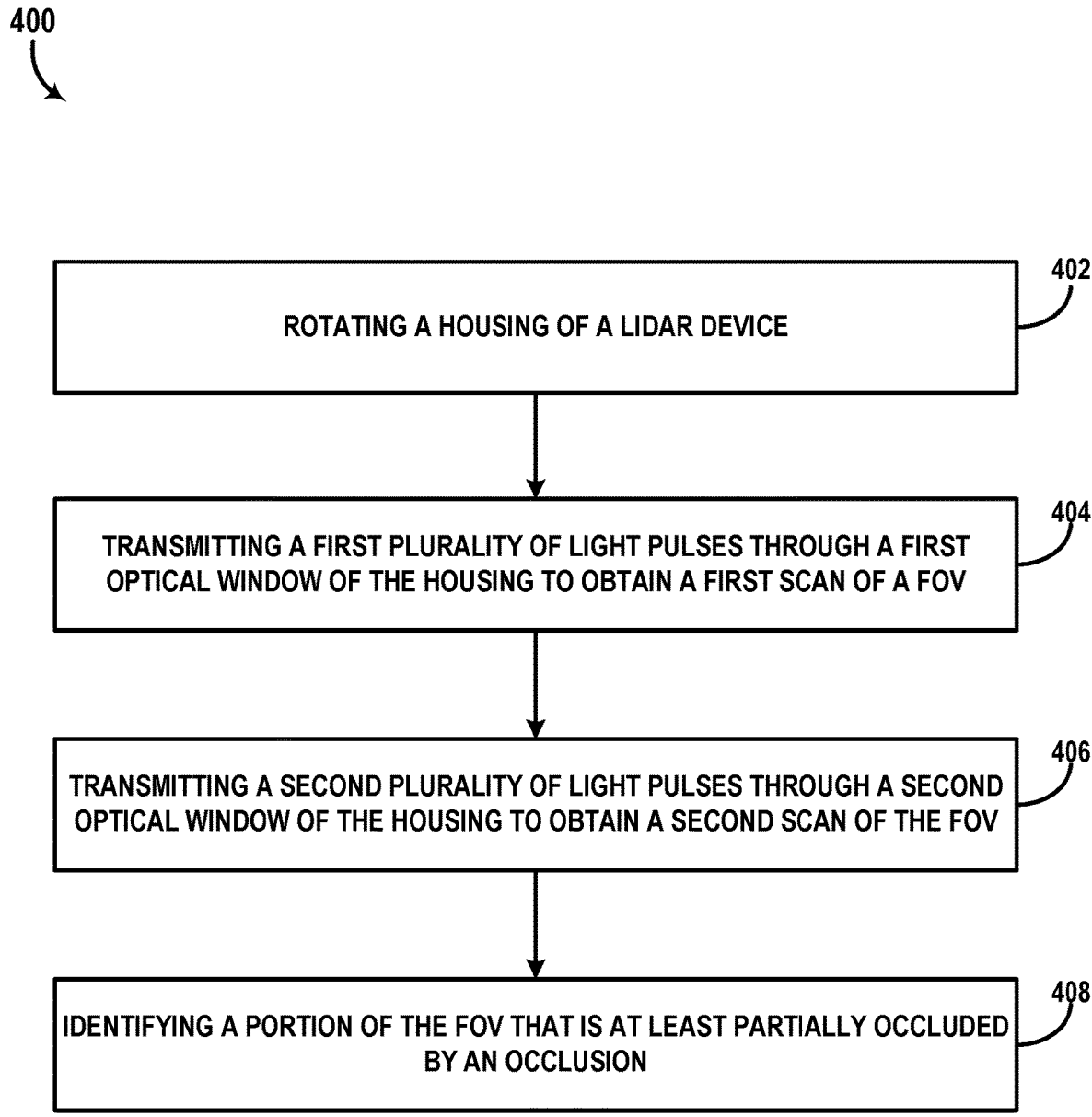
FIG. 4 is a flowchart of a method, according to example embodiments.

FIG. 4 is a flowchart of a method 400, according to example embodiments. Method 400 presents an embodiment of a method that could be used with any of system 100, device 200, and/or vehicle 300, for example. Method 400 may include one or more operations, functions, or actions as illustrated by one or more of blocks 402-408. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 400 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for method 400 and other processes and methods disclosed herein, each block in FIG. 4 may represent circuitry that is wired to perform the specific logical functions in the process.

At block 402, method 400 involves rotating a housing of a LIDAR device about a first axis. As shown in FIG. 2B for example, LIDAR device 200 may rotate housing 250 about axis 219 (e.g., by using rotating platform 210 which supports housing 250, etc.) to adjust a horizontal pointing direction (e.g., yaw direction) of emitted light 260 (shown in FIG. 2A).

At block 404, method 400 involves transmitting a first plurality of light pulses through a first optical window of the housing to obtain a first scan of a FOV.

As shown in FIG. 2C for example, LIDAR 200 may transmit (at least a portion of) emitted light 260 through first optical window 252 of housing 250. In some examples, emitter 222 of LIDAR 200 may emit light 260 as a series of light pulses (i.e., the first plurality of light pulses at block 404). For instance, emitted light pulses 260 can be emitted periodically, intermittently, or may be separated temporally according to another modulation scheme. Additionally, as rotating platform 210 rotates about axis 219 (shown in FIG. 2B), each emitted light pulse may be steered horizontally to have a respective yaw direction according to a current rotational position of platform 210 about axis 219. Thus, for instance, the first plurality of light pulses at block 404 may be transmitted through first optical window 252 over a range of yaw angles (i.e., range of rotational positions of platform 210 about axis 219) to obtain the first scan of a horizontal FOV of LIDAR 200.

In some examples, LIDAR 200 may be configured to repeatedly scan a FOV that extends horizontally over 360 degrees via the first optical window 252. For instance, actuator 218 (shown in FIG. 2B) may be configured to repeatedly rotate platform 210 complete rotations (i.e., 360 degree rotations) about axis 219. As such, LIDAR 200 may be configured to obtain a full scan (e.g., of the 360-degree FOV) through the first optical window 252 during each complete rotation of platform 210 about axis 219.

At block 406, method 400 involves transmitting a second plurality of light pulses through a second window of the housing.

As shown in FIG. 2C for example, housing 250 includes second optical window 254 (opposite first optical window 252). In an example scenario, mirror 244 could be rotated in a clockwise direction about axis 215 (relative to the configuration of mirror 244 shown in FIG. 2C). In this scenario, reflective surface 244b may begin to intercept and reflect emitted light 260 from transmitter 220 out of the second optical window 254. More generally, in this example, the second plurality of light pulses at block 406 may include a subset of emitted light pulses 260 that are emitted by emitter 222 during times when any of reflective surfaces 244a, 244b, or 244c is facing both transmitter 220 and optical window 254. Similarly, the first plurality of light pulses at block 404 may include a subset of emitted light pulses 260 that are emitted by emitter 222 during times when any of reflective surfaces 244a, 244b, or 244c is facing both transmitter 220 and optical window 252.

As noted above, in some examples, LIDAR 200 may be configured to repeatedly scan a FOV via the first optical window 252 and (simultaneously) scan the same FOV via the second optical window 254. For example, LIDAR 200 may be configured to obtain two separate scans (e.g., the first scan of block 404 and the second scan of block 406) of the same FOV during a same scanning time period by interchangeably transmitting light beams out of optical windows 252 and 254 (e.g., based on the rotation of mirror 244).

In some examples, method 400 involves obtaining the first scan of the FOV and the second scan of the FOV based on measurements of reflected light pulses intercepted by one or more detectors of the LIDAR device during one complete rotation of the housing about the first axis. Referring back to FIG. 2D for example, detector(s) 232 can be used to detect reflected light pulses 270, which are received by LIDAR 200 via any of optical windows 252 and 254 (and reflected by mirror 244 toward receiver 230) during one complete (360 degree) rotation of housing 250 about axis 219 (shown in FIG. 2B). In this way, during each complete rotation of housing 250 about axis 219 (e.g., 360 degree rotation), LIDAR 200 can obtain two separate scans (the first scan via window 252 and the second scan via window 254) of the same FOV.

In some examples, method 400 involves emitting, by a transmitter inside the housing, the first plurality of light pulses and the second plurality of light pulses toward a mirror inside the housing. For example, as shown in FIG. 2C, the same transmitter 220 may emit both the first plurality of light pulses (i.e., portion of emitted light 260 reflected by mirror 244 toward optical window 252) and the second plurality of light pulses (i.e., another portion of emitted light 260 reflected by mirror 244 toward optical window 254).

Thus, in some examples, method 400 may also involve the transmitter transmitting the first plurality of light pulses and the second plurality of light pulses toward a mirror inside the housing; and reflecting, via the mirror, the first plurality of light pulses toward the first optical window and the second plurality of light pulses toward the second optical window.

Referring back to FIG. 2C, LIDAR 200 may use the same optical components (e.g., emitter 222, transmit lens 240, mirror 244, etc.) to define the respective optical paths of the first plurality of light pulses (transmitted through window 252) and the second plurality of light pulses (transmitted through window 254). In this way, the two scans (e.g., the first scan and the second scan) obtained through both optical windows 252 and 254 could be expected to be substantially similar to one another (e.g., temporally and spatially).

By way of example, consider a scenario where platform 210 rotates at a rate of 10 Hertz (Hz). In this scenario, the first scan and the second scan of the FOV may be performed during a same scanning period of 0.1 seconds (s). For instance, at time t=0, LIDAR 200 may transmit a vertical column of light pulses at a yaw angle of 0° (through optical window 252) and then a vertical column of light pulses at a yaw angle of 180° (through optical window 254). Between t=0 and t=0.05 s (i.e., first half the scanning period), platform 210 in this scenario may rotate for 180° about yaw axis 219 while similarly transmitting vertical columns of light pulses out of both windows 252 and 254 interchangeably. Further, at t=0.05 s, LIDAR 200 may then transmit another vertical column of light pulses at the yaw angle of 0° (through optical window 254) and another vertical column of light pulses at the yaw angle of 180° (through optical window 252). Next, between time t=0.05 s and t=0.1 s (i.e., second half of the scanning period), LIDAR 200 may then scan the yaw angles between 0° and 180° via window 254 and the yaw angles between 180° and 360° via window 252.

Thus, in this scenario, the first scan and the second may be substantially similar (e.g., approximately 0.05 seconds delay between corresponding light pulses of the two scans that are transmitted in a substantially similar direction). Other scenarios are possible.

At block 408, method 400 involves identifying a portion of the FOV that is at least partially occluded by an occlusion. For instance, the occlusion may intercept at least a portion of light transmitted by the LIDAR device toward the identified portion of the FOV.

The identification of the portion of the FOV at block 408 could be based on the first scan, the second scan, or both the first scan and the second scan. Thus, in some examples, a system of method 400 may be configured to identify the portion of the FOV at block 408 based on one or more scans of the FOV obtained by the LIDAR device via a single optical window. In other examples, a system of method 400 may be configured to identify the portion of the FOV at block 408 based on one or more scans of the FOV obtained by the LIDAR device via both the first optical window and the second optical window.

By way of example, a system of method 400 may monitor first respective numbers of light pulses transmitted toward respective portions of the FOV by the LIDAR device, and second respective numbers of reflected light pulses detected by the LIDAR device from the respective portions. In some instances, the system could also monitor numbers of transmitted/reflected light pulses transmitted through the first optical window (e.g., the first scan) separately from those transmitted through the second optical window (e.g., the second scan). Depending on a variety of factors, the system can use the monitored numbers to decide if a particular portion of the FOV is occluded.

In some scenarios, the LIDAR device may fail to detect a reflection of a particular transmitted light pulse (even when no occlusion is present) for a variety of reasons. In a first scenario, some of the transmitted and/or reflected light pulses may be diverted away from an expected optical path due to environmental factors (e.g., small particles in the air, electromagnetic noise, weather conditions, etc.). In a second scenario, some of the transmitted and/or reflected light pulses may not be detected due to a fault in the LIDAR device (i.e., not due to an external occlusion), such as pulses degraded by a filter of the LIDAR device, pulses diverted by an aperture of the LIDAR, pulses diverted due to a misalignment error, or pulses that are not detected due to other intrinsic characteristics of the LIDAR device (e.g., sensitivity of the detectors, intrinsic measurement errors, etc.). In a third scenario, one or more light pulses may be temporarily occluded by an object in the FOV (e.g., a flying piece of paper that occludes the LIDAR device only for a short period of time, etc.).

Accordingly, in some examples, a system of method 400 may be configured to determine a likelihood that the occlusion is physically coupled to the LIDAR device (e.g., attached to the LIDAR device, or attached to another nearby structure, etc.), the extent of the occlusion, and/or whether the occlusion is likely to remain physically coupled to the LIDAR device if no responsive action is taken (e.g., without activating a cleaning apparatus, etc.). For instance, the system can make these determinations by assessing various factors such as: returning light pulse intensities/numbers, prior information about the prevalence of a certain type of occlusion in a region of the environment where the LIDAR device is currently located, a speed of a vehicle on which the LIDAR device is mounted, and/or corroborating data from other sensors, among other possible factors.

In a first example, method 400 may involve determining whether the occlusion is coupled to the LIDAR device based on at least a speed of a vehicle on which the LIDAR device is mounted. For instance, a fast moving vehicle may be more susceptible (than a slower vehicle) to occlusions like a plastic bag or other flying debris remaining physically attached to the LIDAR device for a longer period of time (e.g., due to a relatively stronger headwind expected when the vehicle is moving at a high speed).

In a second example, determining whether the occlusion is coupled to the LIDAR device may involve determining whether the occlusion remains at an offset position relative to the LIDAR device in response to a movement of the LIDAR device from a first location to a second location in an environment of the LIDAR device. For instance, where the LIDAR device is mounted on a vehicle (e.g., vehicle 300), a computing system (e.g., computing system 310) of the vehicle may compare measurements of a distance between the LIDAR device and the occlusion indicated by a first scan (performed when the LIDAR device is at the first location) and a second scan (performed when the LIDAR device is at the second location). If the comparison indicates that the occlusion remains at a particular offset position relative to the LIDAR device, then the computing system can determine that the occlusion is physically coupled to the LIDAR device (e.g., attached to the LIDAR device or attached to the vehicle). Alternatively or additionally, in this example, if the distance to the occlusion changes and/or is no longer present after the vehicle (and thus the LIDAR device) moves from the first location to the second location, then the computing system may determine that the occlusion is not coupled to the LIDAR device (e.g., a nearby object in the environment that is not physically attached to (or near) the LIDAR device, etc.).

In a third example, method 400 may involve identifying the portion of the FOV at block 408 further based on sensor data collected by one or more other sensors configured to scan the portion of the FOV. For instance, vehicle 300 may be configured to scan the same portion of the FOV using the LIDAR device of method 400 (e.g., LIDAR 332) and one or more other sensors (e.g., LIDAR(s), RADAR(s), camera(s), etc.) of sensor system determining whet 304. In this instance, the vehicle may compare (e.g., via computer system 310, etc.) the scans by the LIDAR device with the scans by the one or more other sensors the multiple sensors to determine if the LIDAR device is occluded from scanning the portion of the FOV identified at block 408.

In some examples, method 400 involves determining an extent to which the occlusion occludes the identified portion of the FOV. In one example, identifying the portion of the FOV at block 408 may be based on a determination that the occlusion intercepts at least a threshold number of light pulses. In one example, the threshold number may be 10,000 pulses (e.g., in a system that requires detection of at least 10,000 pulses from the portion of the FOV, etc.). Other threshold numbers are possible as well.

In some examples, method 400 may involve determining a first number of light pulses transmitted by the LIDAR device toward a given portion of the FOV and a second number of detected light pulses that reflected off one or more objects in the given portion of the FOV. In some examples, method 400 may also involve identifying a given portion of the FOV that is at least partially occluded based on the second number of light pulses being less than half the first number of light pulses. In one example, a system of method 400 may determine that the number of light pulses occluded from the given portion of the FOV is less than a number of detected light pulses that were reflected by objects in the given portion of the FOV. In this example, the system may decide that the given portion of the FOV is likely not at least partially occluded by a given occlusion (e.g., the second number of light pulses is not sufficient for identifying the given portion of the FOV as being partially occluded, etc.).

In some examples, method 400 involves determining whether the occlusion (of block 408) rotates with the housing. As noted above, in some instances, a system of method 400 may respond to the detection of an occlusion depending on a type of the occlusion. In one scenario, if the occlusion rotates with the housing, the occlusion might correspond to an object (e.g., dirt, debris, etc.) that is disposed on an optical window. However, in another scenario, the rotating occlusion might alternatively correspond to an object (e.g., plastic sheet, etc.) that is attached to a rotating component of the LIDAR device (e.g., rotating platform 210, housing 250, etc.), where a portion of the attached object extends near one or both optical windows (e.g., portion of a plastic bag attached to the housing but extending near one or both of the optical windows.

In some examples, a system of method 400 may be configured to attempt removing the occlusion (e.g., using cleaning apparatus 160, etc.) in response to a determination that the occlusion rotates with housing.

To facilitate determining whether the occlusion rotates with the housing (and/or if the occlusion is disposed on the first optical window), in a first example, a system of method 400 could determine a first number of light pulses transmitted through a particular section of the first optical window. The particular section of the first optical window can be selected as the section through which transmitted light pulses within a range of pitch angles where the least partially occluded portion of the FOV identified at block 408 is present. Referring back to FIG. 2D for instance, the identified portion of the FOV may correspond to the portion of the FOV scanned when mirror 244 is at a pitch angle about axis 215 between 0° and −10°. In this example, the system may compute the first number of light pulses that are transmitted through the first optical window 252 (i.e., in the first scan) within this range of pitch angles and at any yaw angle (e.g., any rotational position of platform 210 about axis 219). Next, the system may determine a second number of reflected light pulses that were detected (e.g., by detector 232 of LIDAR 200) from the same range of pitch angles (and at any yaw angle). The system may then compare the first number and the second number to determine if the occlusion is likely disposed on the first optical window. For instance, if the second number is less than half the first number (i.e., more light pulses were intercepted by the occlusion at every yaw angle than light pulses transmitted to the identified portion of the FOV), then the system can determine that the occlusion likely rotates with the housing (e.g., because it seems to occlude the first optical window consistently regardless of the yaw direction of the housing). Accordingly, in some implementations, method 400 may involve determining whether the occlusion rotates with the housing based on the first scan.

In a second example, to determine if the occlusion occludes the second optical window, the system may determine and compare respective numbers of transmitted and detected light pulses, through the second optical window, that are within the same range of pitch angles (and that have any yaw angle). Accordingly, in some implementations, method 400 may involve determining whether the occlusion rotates with the housing based on the second scan.

In a third example, to distinguish between occlusions that occlude only one of the two optical windows and occlusions that occlude both windows, the system may perform both of the comparisons described above in the first example and the second example. If it is determined that the occlusion occludes only the second optical window but not the first optical window for instance, then the system may confirm its determination that the occlusion likely rotates with the housing (and that it is likely disposed at or near the second optical window). Accordingly, in some implementations, method 400 may involve determining whether the occlusion rotates with the housing based on the first scan and the second scan.

In some examples, as noted above, method 400 may involve determining that the occlusion does not occlude the identified portion of the FOV (of block 408) in the first scan associated with the first optical window. In these examples, as noted above, method 400 may also involve determining that the occlusion is disposed on the second optical window based on the determination that the occlusion does not occlude the identified portion of the FOV in the first scan associated with the first window.

In some examples, method 400 involves operating a cleaning apparatus based on a determination that the occlusion is disposed on the second optical window. Referring back to FIG. 1 for example, system 100 may operate cleaning apparatus 160 to attempt removing the occlusion from the second optical window. For instance, cleaning apparatus 160 may include a liquid spray device, a high pressure air pump, or a wiping device, among other examples. In some instances, system 100 may operate the cleaning apparatus based on a location of the particular section of the FOV where the occlusion expected to reside (e.g., the section associated with the range of pitch angles of light pulses transmitted toward the identified portion of the FOV, etc.). For instance, system 100 could operate cleaning apparatus 160 to clean the particular section of the second optical window efficiently (e.g., focus air pump or wiper or liquid spray at the location of the particular section of the second optical window where the occlusion is expected to be present, etc.).

In some examples, method 400 involves mapping respective portions of the FOV to respective sections of the first optical window. In these examples, identifying the portion of the FOV at block 408 may be based on the mapping. For instance, a system of method 400 may be configured to monitor multiple sections of the first optical window simultaneously to facilitate detecting occlusions that occlude a respective section of the first optical window regardless of the yaw orientation of the rotating housing.

In a first implementation, the FOV of LIDAR 200 may extend vertically between a pitch angle (e.g., angular position of mirror 244 about axis 215, etc.) of +30° to a pitch angle of −90°. For instance, LIDAR 200 may be configured to vertically steer the first plurality of light pulses through the first optical window 252 at respective pitch angles within this range (i.e., between +30° and −90°). In this implementation, the system of method 400 (e.g., LIDAR 200, system 100, vehicle 300, etc.) may be configured to map a first portion of the FOV within a pitch range of +30° to +10° with a corresponding (lengthwise) section of optical window 252 through which a subset of light pulses 260 having pitch angles within this range are transmitted out of housing 250.

Similarly, a second section of optical window 252 could be mapped with a second portion of the FOV a pitch range of +10° to −10°, and so on. In this implementation, 6 lengthwise sections of window 252 can be selected for mapping with 6 pitch-wise portions of the FOV.

In a second implementation, the mapping can be alternatively limited to a smaller subset of the entire FOV (e.g., a portion of the vertical FOV between angles +10° to −20° can be mapped to six corresponding sections of optical window 252, etc.). For instance, the range of pitch angles selected for the mapping may be selected according to an application of LIDAR 200. For example, in an application where LIDAR 200 is mounted on a vehicle, the selected range can be a range of pitch angles that overlaps expected locations of relatively stationary and/or uniform surfaces (e.g., road, etc.).

In a third implementation, the respective portions of the FOV can be mapped to any number of sections of the first optical window (e.g., not necessarily 6 sections), and one or more sections may be assigned to a different vertical portion of the FOV than other sections (e.g., first section from +10° to −10°, second section from −10° to −15°, etc.). To that end, the sizes of each range of pitch angles selected for mapping may depend on various applications of LIDAR 200. For instance, a smaller range of pitch angles can be selected in a scenario where detection of small occlusions is appropriate (e.g., LIDAR 200 may be configured to detect objects at a high resolution within that range of pitch angles, etc.).

In some examples, mapping the respective portions of the FOV to the respective sections of the first optical window may involve, for each section of the first optical window: identifying emitted light pulses that are transmitted toward the section; and identifying reflected light pulses that are detected by one or more detectors of the LIDAR device and that correspond to reflections of the emitted light pulses. In these examples, mapping the respective portions may also optionally involve determining (based on the identification of the emitted light pulses and the reflected light pulses) an occlusion score indicative of a likelihood that a respective portion of the FOV associated with the section is at least partially occluded. The occlusion score may include any statistical measure of a relationship between the emitted light pulses and the reflected light pulses.

To that end, in some examples, determining the occlusion score may involve determining a first count of the identified light pulses and a second count of the reflected light pulses. For example, in line with the discussion above, a system of method 400 may keep track of the first count of emitted light pulses transmitted to each section of the first optical window, and the second count of reflected light pulses (e.g., received by the LIDAR device from a corresponding mapped portion of the FOV illuminated via that section).

In one implementation, the occlusion score may correspond to a difference between the first count and the second count. Other example occlusion score computations for determining the likelihood that an occlusion is present are possible as well.

In some examples, method 400 may involve selecting one of a plurality of cleaning apparatuses (e.g., cleaning apparatuses 160, etc.) for attempting removal of the occlusion based on at least the occlusion score. In one example, if the occlusion score is relatively high (e.g., difference between the first count of emitted light pulses and the second count of reflected light pulses is greater than a first threshold score, etc.), then the system may select a first cleaning apparatus (e.g., wiper, etc.) to attempt removal of the occlusion. In another example, if the occlusion score is relatively low (e.g., difference between first count and second count is: (i) less than the first threshold score and (ii) greater than a second threshold score), then the system may select a second cleaning apparatus (e.g., water spray, etc.) to attempt removal of the occlusion.

In some examples, identifying the reflected light pulses of the mapping may be based on the reflected light pulses being reflected from one or more objects that are at greater than a threshold distance to the LIDAR device. The threshold distance to the LIDAR device (for a reflected light pulse to be included in the second count) may be selected depending on a variety of factors. In one implementation, the threshold distance may be approximately zero. In this implementation, a system of method 400 may consider any detected reflection from an object that is out of the housing (i.e., at any distance away from the first optical window) as a successful (not occluded) scan of a respective portion of the FOV. In another implementation, the threshold distance can be greater than zero. For example, the system may be configured to associate detected pulses that were reflected 10 centimeters away (or less) from the LIDAR device with potential occlusions coupled to the LIDAR device (e.g., paper that is attached to vehicle 300 and extending in front of the first optical window within 10 centimeters away from the LIDAR device, etc.). Other threshold distances are possible.

In some examples, method 400 involves determining that the occlusion (of block 408) is disposed on the first optical window based on the mapping. As noted above for example, a system of method 400 may determine that the occlusion is disposed on the first optical window if the second count of reflected light pulses (e.g., corresponding to transmitted light pulses that are deemed not occluded by the occlusion) is lower than an acceptable level (e.g., less than half the first count of transmitted level, or less than any other threshold, etc.).

In some examples, method 400 may also involve identifying a particular section of the first optical window where the occlusion is disposed based on the mapping. As noted above, for example, the mapping can be used to identify the particular section (of the mapped sections) associated with a relatively low number of reflected light pulse detections (e.g., relative to the total number of light pulses transmitted toward the particular section).

In some examples, method 400 may also involve mapping the respective portions of the FOV to respective sections of the second optical window. For instance, the same respective portions of the FOV (e.g., ranges of pitch angles) that are mapped to the first optical window can be similarly mapped to the second optical window.

Additionally, in these examples, determining that the occlusion is disposed on the first optical window may be further based on the mapping of the respective portions of the FOV to the respective sections of the second optical window. For instance, the system of method 400 may confirm that the occlusion is attached to the first optical window only (e.g., rather than an occlusion that affects both optical windows) by checking if the occluded portion of the FOV also occludes the second optical window at any yaw angle in the second scan (as well as in the first scan).

In some implementations, a system of method 400 may be configured to monitor light pulses transmitted toward (and/or received from) a particular portion of the FOV through the first optical window or through the second optical window. For instance, the system could monitor the number of successful (not occluded) light pulse detections reflected from each respective portion of the FOV relative to the total number of light pulses transmitted to that selected portion (e.g., regardless of the particular optical window through which the light pulses were transmitted and/or received).

Accordingly, in some examples, method 400 may involve, for each respective portion of a plurality of portions of the FOV: identifying emitted light pulses transmitted toward the respective portion through the first optical window or the second optical window; and identifying reflected light pulses that are detected by one or more detectors of the LIDAR device and that correspond to reflections of the identified light pulses. In some examples, identifying the reflected light pulses may be based on the reflected light pulses being reflected from one or more objects that are at a greater than a threshold distance to the LIDAR device, in line with the discussion above.

In some examples, method 400 may also optionally involve determining an occlusion score (based on the identification of the emitted light pulses and the reflected light pulses), similarly to the occlusion score described above for the mapping of the respective sections of the first optical window. For example, determining the occlusion score may involve determining a first count of the emitted light pulses and a second count of the reflected light pulses.

In this way, for instance, the example system can monitor the respective portions of the FOV for occlusions that affect both optical windows. For example, the system can determine that a particular portion of the FOV is occluded by an occlusion that does not rotate with the housing if the second count is less than half the first count (or if the difference between the second count and the first count is more than a threshold). Accordingly, in some implementations, method 400 may involve determining whether the occlusion rotates with the housing based on the first count and the second count.

In some examples, method 400 may involve selecting a plurality of portions of the FOV to monitor for presence of occlusions. In these examples, identifying the portion of the FOV at block 408 may involve identifying the portion from the selected plurality of portions of the FOV. In one example, the selected plurality may correspond to the portions of the FOV that are mapped to sections of the first optical window (and/or the second optical window). In another example, the selected plurality may correspond to the portions of the FOV that are mapped to corresponding (emitted and/or detected) light pulses regardless of the particular optical window through which these portions are scanned by the LIDAR device.

In some implementations, each selected portion of the FOV may have a same width and a same height. In some examples, the width may be associated with a respective range of light pulse yaw directions, and the height may be associated with a respective range of light pulse pitch directions. In other examples, the width and height of each portion of the FOV may vary. In some instances, the width and height of each selected portion may be associated with a threshold size of the occlusion that the system wants to detect. For example, a larger portion of the FOV can be monitored for detecting larger occlusions, and a smaller portion can be monitored separately to facilitate detecting smaller occlusions, etc.

Referring back to FIG. 2B, in one embodiment, a first selected portion may include a first subset of emitted light pulses 260 having a yaw angle within a first range of yaw angles (e.g., rotational positions of platform 210 about axis 219) between 0° to +30° and having a pitch angle within a first range of pitch angles (e.g., rotational positions of mirror 244 about axis 215) between 0° and −30°. A second selected portion may be associated with another respective range of light pulse yaw and pitch angles, and so on.

In some examples, method 400 involves obtaining data indicating a location of a target object in the FOV. In these example, selecting the plurality of portions of the FOV (e.g., to monitor for light pulse transmissions and corresponding detections, etc.) may be based on the location of the target object.

In a first example, the LIDAR device of method 400 can be included in a vehicle such as vehicle 300. In this example, the data indicating the location of the target can be from another sensor of the vehicle, such as one or more of the sensors in sensor system 304 (e.g., another LIDAR, a RADAR, a camera, etc.), which scans a second FOV that at least partially overlaps with the FOV of the LIDAR device. In this way, for instance, the selected portions of the FOV can be limited to portions where the target object is known to be present (based on the data from the other sensor), and the system could thus determine the first and second counts of light pulses by monitoring for reflections from just the portions where the target object is located. For instance, if other portions of the FOV that do not include the target object were selected instead of the portions that include the target object, a failure to detect reflection from those other portions may be caused by the absence of any objects in the other options (rather than being caused by the presence of an occlusion that occludes the other portions). Accordingly, in some implementations, obtaining the data indicating the location of the target object may involve obtaining sensor data collected by another sensor configured to scan a second FOV that least partially overlaps the FOV of the LIDAR device.

Alternatively or additionally, in a second example, the data indicating the location of the target object could be obtained from a stored map or other representation of an environment of the LIDAR device. For example, data storage 314 of vehicle 300 (and/or data storage 108 of system 100) may store a map of the environment that indicates locations of relatively stationary objects (e.g., roads, pavements, walls, etc.) in the environment of vehicle 300 (and/or the LIDAR device). Thus, the map of the environment can be used as a source for identifying locations of target objects to select particular portions of the FOV to monitor for occlusions (e.g., because reflected light pulses may be expected from those particular portions of the FOV). Accordingly, in some implementations, obtaining the data indicating the location of the target object may involve obtaining, from data storage, a stored representation of an environment of the LIDAR device.

In some examples, method 400 may involve obtaining data indicating a mounting configuration of the LIDAR device. In these examples, selecting the plurality of portions of the FOV may be based on at least the mounting configuration of the LIDAR device. In some instances, the data indicating the mounting configuration may be obtained from data storage (e.g., data storage 108); and may pertain to one or more structures surrounding the LIDAR device.

In a first example, the obtained data may indicate a shape and/or position of a mount (e.g., stationary platform 212, etc.) that couples the LIDAR device with a system (e.g., vehicle 300), platform (e.g., robotic platform, etc.), or any other structure to which the LIDAR device is mounted. In this example, a system of method 400 may select portions of the FOV (e.g., to monitor for presence of occlusions) other than particular portions that are expected to be occluded by the mount.

In a second example, the obtained data may indicate a shape and/or position of one or more structures of a system (e.g., vehicle 300, etc.), platform or any other structure on which the LIDAR device is mounted. For instance, when selecting the portions of the FOV of vehicle-mounted LIDAR device to monitor for occlusions, an example system of method 400 may include portions of the FOV other than given portions in which at least part of the vehicle (e.g., vehicle 300) is present.

Thus, in the first and second examples above, a system of method 400 may use the obtained data to distinguish external occlusions (e.g., external object, dust, etc.) that obstruct at least a portion of the scanned FOV from nearby structures associated with the mounting configuration of the LIDAR device (e.g., mounting platform, top of vehicle, side of vehicle, etc.). Other examples are possible.

Figure 5:
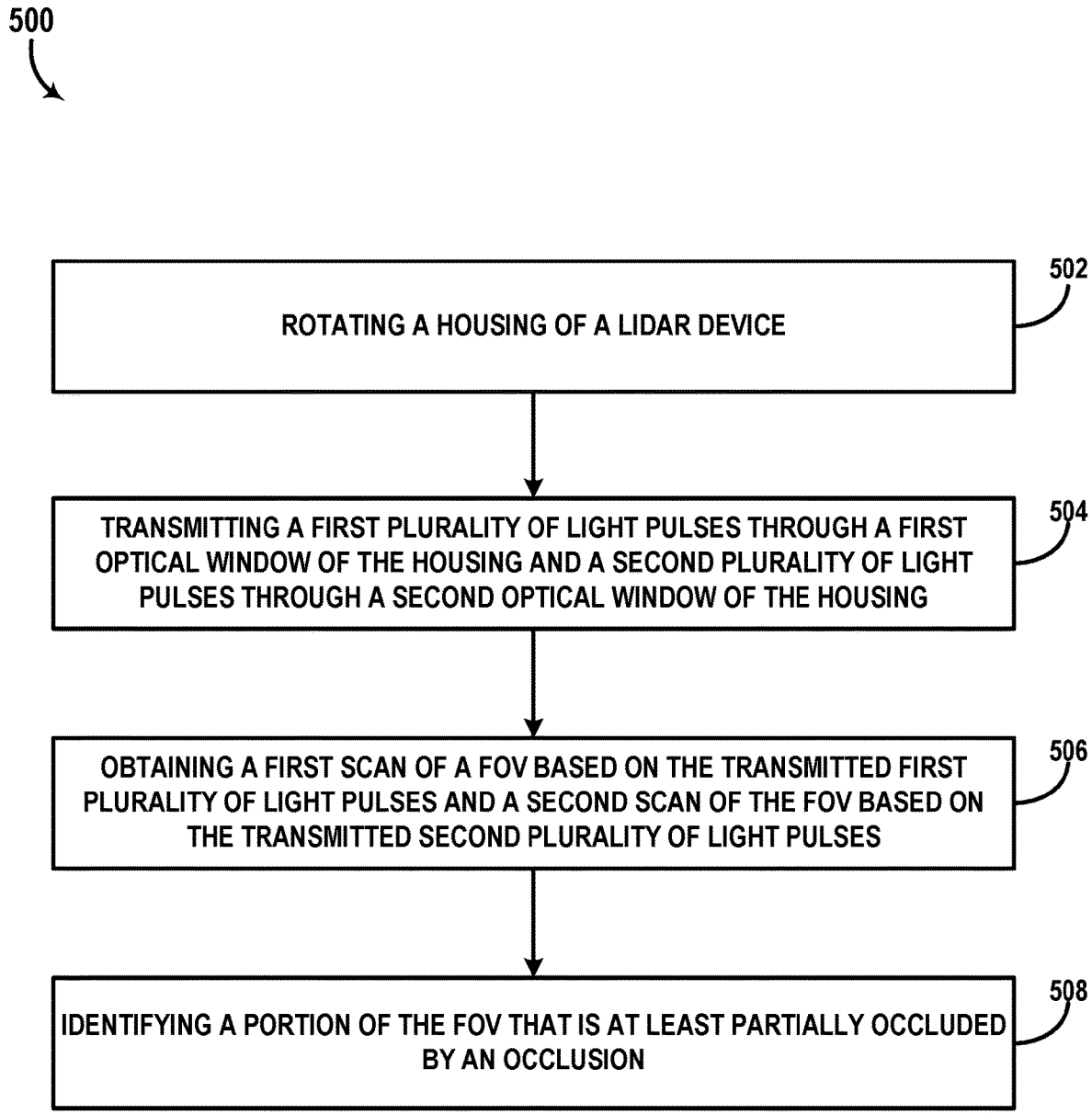
FIG. 5 is a flowchart of another method, according to example embodiments.

FIG. 5 is a flowchart of another method 500, according to example embodiments. Method 500 presents an embodiment of a method that could be used with any of system 100, device 200, vehicle 300, and/or method 400, for example. Method 500 may include one or more operations, functions, or actions as illustrated by one or more of blocks 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 502, method 500 involves rotating a housing of a LIDAR device. For example, block 502 may be similar to block 402 of method 400.

At block 504, method 500 involves transmitting a first plurality of light pulses through a first optical window of the housing and a second plurality of light pulses through a second optical window of the housing. For example, a controller (e.g., controller 104 of system 100) of LIDAR 200 may cause emitter 222 to emit a sequence of light pulses 260. While emitter 222 is emitting the sequence of light pulses, the controller may also cause actuator 214 to rotate mirror 244 about axis 215. In this way, a first subset of the emitted sequence of light pulses 260 (i.e., the first plurality of light pulses) may be reflected by mirror 244 toward the first optical window 252 for transmission out of the housing 250, and a second subset of the emitted sequence of light pulses 260 (i.e., the second plurality of light pulses) may be reflected by mirror 244 toward the second optical 254 for transmission out of the housing 250.

In some examples, the first optical window may be located at a first side of the housing and the second optical window may be located at a second side of the housing opposite the first side. As shown in FIG. 2C for example, the first optical window 252 is located at a first side of housing 250, and the second optical window 254 is located at a second side of housing 250 opposite the first side.

At block 506, method 500 involves obtaining a first scan of a FOV of the LIDAR device based on the transmitted first plurality of light pulses and a second scan of the FOV based on the transmitted second plurality of light pulses. For example, controller 104 of system 100 may obtain the first scan based on measurements of reflected light pulses detected by detector(s) 132 and corresponding to reflections of the transmitted first plurality of light pulses (i.e., transmitted through the first optical window). Similarly, controller 104 may obtain the second scan based on measurements of reflected light pulses detected by detector(s) 132 and corresponding to reflections of the transmitted second plurality of light pulses (i.e., transmitted through the second optical window).

At block 508, method 500 involves identifying a portion of the FOV that is at least partially occluded by an occlusion. For example, block 508 may be similar to block 408 of method 400.

In some examples, method 500 involves determining whether the occlusion is coupled to the LIDAR device.

In a first example, a system of method 500 may compare scans obtained through the first optical window and/or the second optical window over a predetermined number of scan periods (and/or a threshold period of time). In this example, if the identified portion of the FOV remains occluded, then the system could determine that the occlusion is potentially coupled to the LIDAR device (or that the occlusion is likely to remain coupled to the LIDAR device, etc.).

In a second example, the system may determine that the occlusion is coupled to the LIDAR device based on a location of the occlusion. For instance, if the occlusion is at or near a given location of the first optical window (and/or the second optical window), then the system may determine that the occlusion is potentially coupled to the LIDAR device (e.g., disposed on or near one or both optical windows, etc.).

In a third example, a system of method 500 may determine that the occlusion is coupled to the LIDAR device based on at least a determination that the occlusion rotates with the housing (in line with the discussion at block 408 of method 400).

In a fourth example, a system of method 500 may determine that the occlusion is coupled to the LIDAR device based on a determination that the identified portion of the FOV at block 508 is not occluded in the first scan of the FOV obtained through the first optical window. For instance, if the occlusion affects only one optical window, then the system may determine that the occlusion is likely coupled to that optical window (e.g., physically attached to the LIDAR device, etc.).

Accordingly, in some implementations, determining whether the occlusion is coupled to the LIDAR device involves determining whether the occlusion (e.g., dust, plastic bag, etc.) is physically attached to the LIDAR device.

In some examples, the LIDAR device may be mounted on a system (e.g., vehicle 300). In these examples, determining whether the occlusion is coupled to the LIDAR device may involve determining whether the occlusion is physically attached to the system. For example, if the occlusion remains at a substantially same offset position relative to the LIDAR device when the system (e.g., vehicle 300) moves from a first location to a second location in the environment, then the system can determine that the occlusion is potentially coupled to the LIDAR device (e.g., part of an object, such as a plastic bag or other object, that remains within the FOV of the LIDAR device because the object is physically attached to the vehicle, etc.).

Accordingly, in some implementations, determining whether the occlusion is coupled to the LIDAR device involves determining whether the occlusion remains at a substantially same offset position relative to the LIDAR device in response to a movement of the LIDAR device from a first location to a second location in an environment of the LIDAR device.

Figure 6:
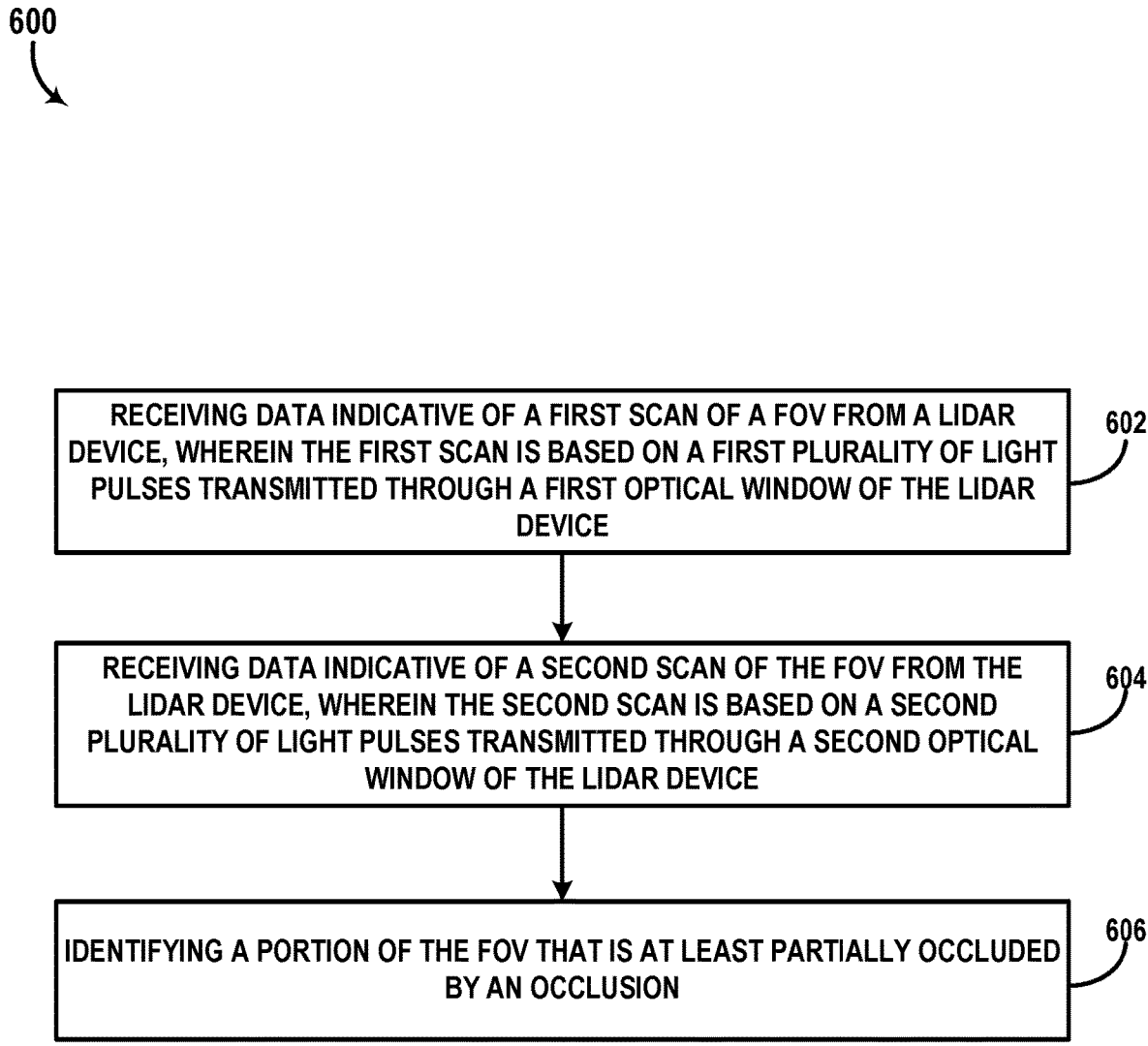
FIG. 6 is a flowchart of yet another method, according to example embodiments.

FIG. 6 is a flowchart of yet another method 600, according to example embodiments. Method 600 presents an embodiment of a method that could be used with any of system 100, device 200, vehicle 300, and/or methods 400-500, for example. Method 600 may include one or more operations, functions, or actions as illustrated by one or more of blocks 602-606. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 602, method 600 involves receiving data indicative of a first scan of a FOV from a LIDAR device. The first scan is based on a first plurality of light pulses transmitted through a first optical window of the LIDAR device. For example, computer system 310 of vehicle 300 may receive sensor data collected by a LIDAR (e.g., LIDAR unit 332, LIDAR 200, etc.). For instance, the received sensor data at block 602 may be indicative of the first scan described at block 404 of method 400 (e.g., the first scan may be based on the first plurality of light pulses transmitted by LIDAR 200 through the first optical window 252).

At block 604, method 600 involves receiving data indicative of a second scan of the FOV from the LIDAR device. The second scan is based on a second plurality of light pulses transmitted through a second optical window of the LIDAR device. Continuing with the example above, computer system 310 may also receive sensor data collected by the same LIDAR (e.g., LIDAR 332, LIDAR 200, etc.). For instance, the received sensor data at block 604 may be indicative of the second scan described at block 406 of method 400 (e.g., the second scan may be based on the second plurality of light pulses transmitted by LIDAR 200 through the second optical window 254).

At block 606, method 600 identifying a portion of the FOV that is at least partially occluded by an occlusion. For example, block 606 may be similar to block 408 of method 400 and/or block 508 of method 500.

In some examples, method 600 involves generating operation instructions for a vehicle that includes the LIDAR device. For example, vehicle 300 may include the LIDAR device of method 600 (e.g., as part of LIDAR unit 332). Thus, for instance, computer system 310 may use data from the LIDAR device (and/or one or more other sensors of sensor system 304) to generate the operation instructions for operating vehicle 300. To that end, the generated operation instructions may relate to any of the functions described in connection with control system 306, such as navigation instructions for navigating vehicle 300 in the environment (e.g., navigation/pathing system 348, obstacle avoidance system 350, etc.), instructions for operating one or more components of sensor system 304 (e.g., adjusting the FOVs scanned by the respective sensors, etc.), among other examples.

In some examples, method 600 involves modifying the generated operation instructions in response to identifying the portion of the FOV at block 606 (e.g., the portion that is at least partially occluded). In a first example, vehicle 300 may select or assign another sensor of sensor system 304 to scan (at least part of) the identified (occluded) portion of the FOV in addition to or instead of the LIDAR device of method 600. In a second example, vehicle 300 may modify navigation instructions (e.g., previously generated for navigating the vehicle in an autonomous mode) to stop the vehicle until an identified occlusion is removed to allow the LIDAR device to scan the identified portion of the FOV. In a third example, vehicle 300 may provide (e.g., via touchscreen 354) a message for display to a user of vehicle 300 (e.g., the message may alert the user that the LIDAR device is occluded, etc.). In a fourth example, vehicle 300 may operate wireless communication system 352 to report the occlusion to a remote server that processes calibration and/or maintenance requests for vehicle 300. Other examples are possible.

Thus, in some examples, a vehicle herein may be configured to operate in an autonomous or semi-autonomous mode based at least in part on sensor data collected by the LIDAR device of method 600. In these examples, one or more operations of the vehicle can be adjusted to account for the detection and/or identification of the occlusion in various ways.

In some examples, method 600 involves generating a combined point cloud representation of the first scan and the second scan. For example, computer system 310 may combine the two scans of the FOV (e.g., the first scan and the second scan simultaneously obtained via, respectively, the first optical window and the second optical window) to generate a single 3D point cloud representation having a greater number of data points (e.g., higher resolution, etc.) as compared to a point cloud that represents only one of the two scans.

In some examples, method 600 involves providing the combined point cloud representation for display. For example, computer system 310 may cause a display (e.g., touch screen 354) to render a 3D view of the scanned FOV (i.e., the combined point cloud representation) for display to a user of vehicle 300.

Figure 7:
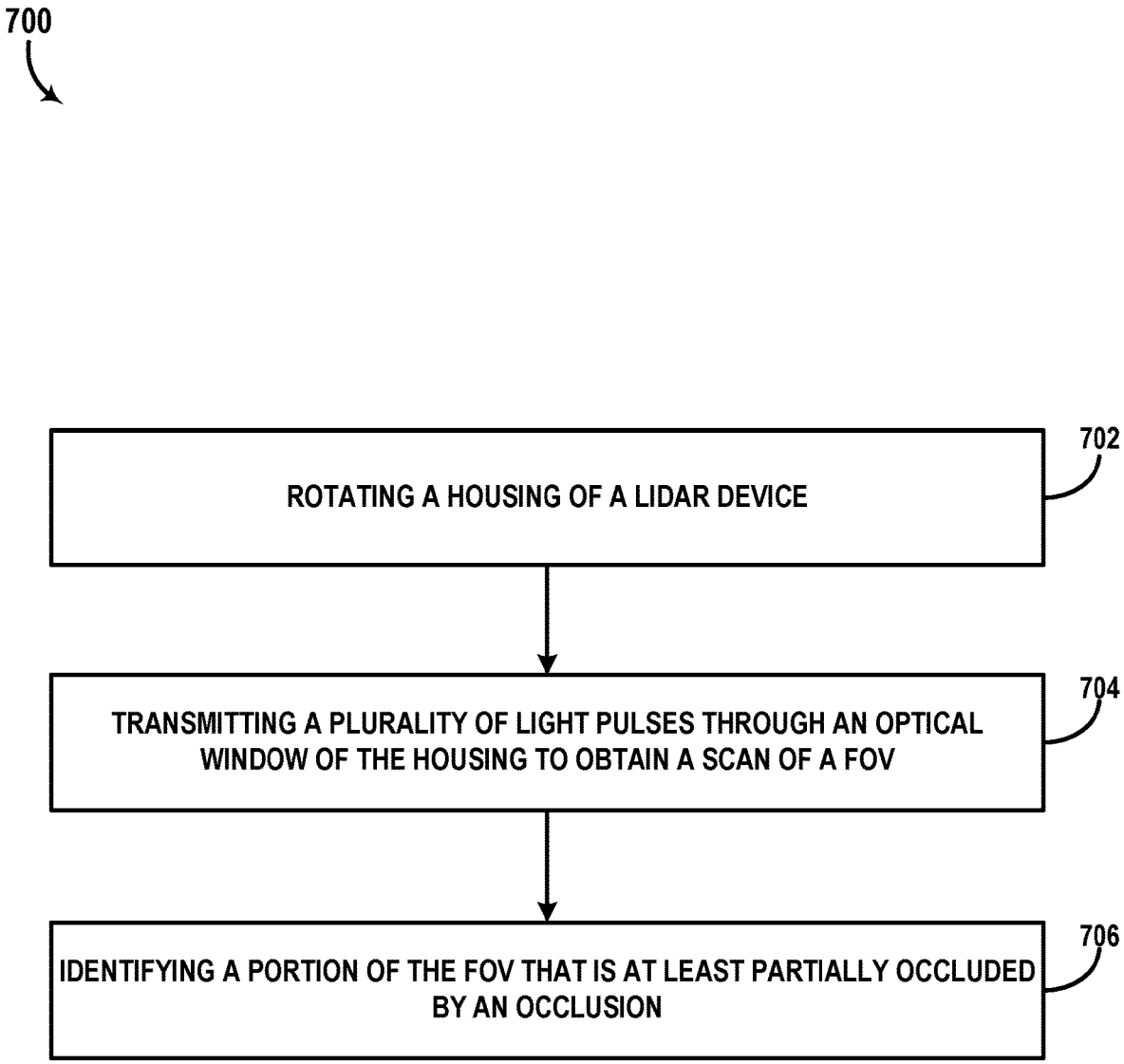
FIG. 7 is a flowchart of still another method, according to example embodiments.

FIG. 7 is a flowchart of still another method 700, according to example embodiments. Method 700 presents an embodiment of a method that could be used with any of system 100, device 200, vehicle 300, and/or methods 400-600, for example. Method 700 may include one or more operations, functions, or actions as illustrated by one or more of blocks 702-706. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 702, method 700 involves rotating a housing of a LIDAR device. For example, block 702 may be similar to block 402 of method 400.

At block 704, method 700 involves transmitting a plurality of light pulses through an optical window of the housing to obtain a scan of a FOV. For example, block 704 may be similar to block 404 of method 400.

At block 706, method 700 involves identifying a portion of the FOV that is at least partially occluded.

As noted above, in some examples, an example system or device herein may be configured to detect occlusions based on one or more scans obtained using a LIDAR device that transmits light pulses through a single optical window (e.g., instead of two separate optical windows). To that end, identifying the at least partially occluded portion of the FOV at block 706 may be similar to one or more processes described at blocks 408, 508, and/or 606.

By way of example, a system of method 700 may be configured to determine a likelihood that the occlusion is physically coupled to the LIDAR device (e.g., attached to the LIDAR device or to another nearby structure, etc.), the extent of the occlusion, and/or whether the occlusion is likely to remain physically coupled to the LIDAR device if no responsive action is taken (e.g., without activating a cleaning apparatus, etc.), in line with the discussion at blocks 408, 508, and/or 606. For instance, method 700 may also involve determining whether the occlusion rotates with the housing, operating a cleaning apparatus, mapping respective portions of the FOV to respective sections of the optical window, determining an occlusion score for each section of the optical window, selecting a plurality of portions of the FOV to monitor for presence of occlusion, and/or obtaining data indicating a location of a target object in the FOV, among other examples described at blocks 408, 508, and/or 606.

IV. Conclusion

The particular arrangements shown in the Figures should not be viewed as limiting. It should be understood that other implementations may include more or less of each element shown in a given Figure. Further, some of the illustrated elements may be combined or omitted. Yet further, an exemplary implementation may include elements that are not illustrated in the Figures. Additionally, while various aspects and implementations have been disclosed herein, other aspects and implementations will be apparent to those skilled in the art. The various aspects and implementations disclosed herein are for purposes of illustration and are not intended to be limiting, with the true scope and spirit being indicated by the following claims. Other implementations may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations.

What is claimed is:

1. A method comprising:
   rotating a surface of a light detection and ranging (LIDAR) device about a first rotational axis, wherein the surface comprises at least one optical window;
   transmitting, by an emitter of the LIDAR device, one or more first light pulses;
   receiving, via the surface and at an aperture of the LIDAR device, the one or more first light pulses;
   detecting, at a detector of the LIDAR device associated with the aperture, the one or more first light pulses to obtain a first scan of a field of view (FOV) of the LIDAR device;
   transmitting, by the emitter of the LIDAR device, one or more second light pulses;
   receiving, via the surface and at the aperture of the LIDAR device, the one or more second light pulses;
   detecting, at the detector of the LIDAR device associated with the aperture, the one or more second light pulses to obtain a second scan of the FOV; and
   based on the first scan and the second scan, identifying a portion of the FOV that is at least partially occluded by an occlusion.

2. The method of claim 1, further comprising determining whether the occlusion is coupled to the LIDAR device.

3. The method of claim 2, wherein the LIDAR device is mounted to a system, and wherein determining whether the occlusion is coupled to the LIDAR device comprises determining whether the occlusion is physically attached to the system.

4. The method of claim 2, wherein determining whether the occlusion is coupled to the LIDAR device comprises determining whether the occlusion is physically attached to the LIDAR device.

5. The method of claim 1, further comprising determining whether the occlusion rotates with the surface based on the first scan and the second scan.

6. The method of claim 1, further comprising, based on the first scan and the second scan, determining that the occlusion does not occlude the identified portion of the FOV in the first scan.

7. The method of claim 1, further comprising operating a cleaning apparatus based on the identified portion.

8. The method of claim 7, wherein the cleaning apparatus comprises a high-pressure gas tube.

9. The method of claim 8, wherein mapping the respective portions of the FOV comprises, for each section of the surface:
   identifying emitted light pulses that are transmitted toward the section of the surface; and
   identifying reflected light pulses that are detected by the detector of the LIDAR device that correspond to reflections of the identified emitted light pulses.

10. The method of claim 7, wherein the cleaning apparatus comprises a wiper configured to attempt to remove the occlusion from the surface.

11. The method of claim 10, further comprising, for each section of the surface:
    based on at least the identification of the emitted light pulses and the identification of the reflected light pulses, determining an occlusion score indicative of a likelihood that a respective portion of the FOV associated with the section is at least partially occluded.

12. The method of claim 10, wherein identifying the reflected light pulses is based on the reflected light pulses being reflected from one or more objects that are at greater than a threshold distance to the LIDAR device.

13. The method of claim 1, further comprising:
    mapping respective portions of the FOV to respective sections of the surface, wherein identifying the portion of the FOV is based on the mapping.

14. The method of claim 13, further comprising:
    based on at least the occlusion score, selecting one of a plurality of cleaning apparatuses for attempting removal of the occlusion.

15. The method of claim 1, further comprising, for each respective portion of a plurality of portions of the FOV:
    identifying emitted light pulses transmitted, through the surface, toward the respective portion of the FOV; and
    identifying reflected light pulses that are detected by one or more detectors of the LIDAR device and that correspond to reflections of the identified light pulses.

16. The method of claim 15, further comprising, for each respective portion of the plurality of portions of the FOV:
    based on at least the identified emitted light pulses and the identified reflected light pulses, determining an occlusion score indicative of a likelihood that the respective portion is at least partially occluded.

17. The method of claim 1, further comprising:
    selecting a plurality of portions of the FOV to monitor for presence of occlusions, wherein identifying the portion of the FOV that is at least partially occluded comprises identifying the portion of the FOV from the selected plurality of portions of the FOV.

18. The method of claim 17, further comprising:
    obtaining data indicating a location of a target object in the FOV, wherein selecting the plurality of portions of the FOV is based on the location of the target object.

19. The method of claim 18, wherein obtaining the data indicating the location of the target object comprises obtaining sensor data collected by another sensor configured to scan a second FOV that at least partially overlaps the FOV of the LIDAR device.

20. The method of claim 17, further comprising:
obtaining, from data storage, an indication of a mounting configuration of the LIDAR device, wherein selecting the plurality of portions of the FOV is based on the mounting configuration of the LIDAR device.

\* \* \* \* \*